United States Patent
Inaba et al.

(10) Patent No.: US 7,750,942 B2
(45) Date of Patent: Jul. 6, 2010

(54) IMAGE PROCESSING APPARATUS AND METHOD, RECORDING MEDIUM, AND PROGRAM FOR CORRECTING CAMERA SHAKE

(75) Inventors: Seijiro Inaba, Kanagawa (JP); Kenji Tanaka, Tokyo (JP); Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1348 days.

(21) Appl. No.: 10/542,844

(22) PCT Filed: Jan. 21, 2004

(86) PCT No.: PCT/JP2004/000497

§ 371 (c)(1),
(2), (4) Date: Jul. 20, 2005

(87) PCT Pub. No.: WO2004/066619

PCT Pub. Date: Aug. 5, 2004

(65) Prior Publication Data

US 2006/0072018 A1   Apr. 6, 2006

(30) Foreign Application Priority Data

Jan. 22, 2003  (JP)  ............... 2003-013685

(51) Int. Cl.
  H04N 5/228  (2006.01)
  H04N 3/14  (2006.01)
  H04N 5/335  (2006.01)
  G03B 17/00  (2006.01)
(52) U.S. Cl. .............. 348/208.1; 348/317; 348/320; 396/55
(58) Field of Classification Search . 348/208.1–208.16, 348/154, 317, 320; 396/55
See application file for complete search history.

(56) References Cited

U.S. PATENT DOCUMENTS

| 5,436,658 | A | * | 7/1995 | Onga et al. | 348/239 |
| 5,894,325 | A | * | 4/1999 | Yonemoto | 348/302 |
| 5,926,212 | A | * | 7/1999 | Kondo | 348/207.99 |
| 5,930,530 | A | | 7/1999 | Hirano et al. | |
| 6,122,004 | A | * | 9/2000 | Hwang | 348/208.13 |
| 6,507,365 | B1 | | 1/2003 | Nakamura et al. | |
| 2002/0163581 | A1 | | 11/2002 | Kitazawa et al. | |

FOREIGN PATENT DOCUMENTS

| EP | 0 748 111 | 12/1996 |
| JP | 8-336076 | 12/1996 |
| JP | 2000-350101 | 12/2000 |
| JP | 2001-358999 | 12/2001 |
| JP | 2001358999 A * | 12/2001 |

* cited by examiner

Primary Examiner—Nhan T Tran
Assistant Examiner—Mekonnen Dagnew
(74) Attorney, Agent, or Firm—Frommer Lawrence & Haug LLP; William S. Frommer; Thomas F. Presson

(57) ABSTRACT

The present invention relates to an image processing apparatus and method enabling to correct for camera shake given in image capturing, a recording medium, and a program. Discrete data pieces indicating shifts are obtained. The discrete data pieces are interpolated to obtain data indicating a shift every line. By the interpolation, a correction is calculated every line on the basis of the corresponding shift. On the basis of the corrections, pixel data read positions are determined. Pixel data is read based on the determined read positions. When a pixel to be read overlaps two pixels, pixel data of the pixel to be read is produced (interpolated) from pixel data pieces. In this manner, the effects of camera shake are corrected. The present invention is applicable to video cameras.

12 Claims, 21 Drawing Sheets

FIG. 4
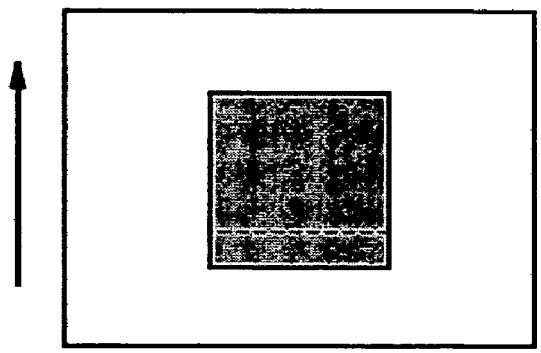
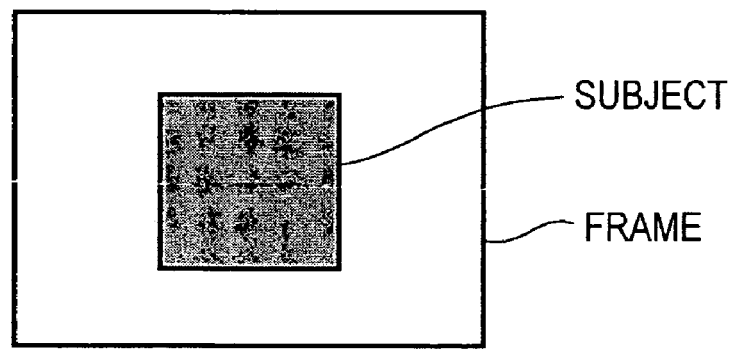
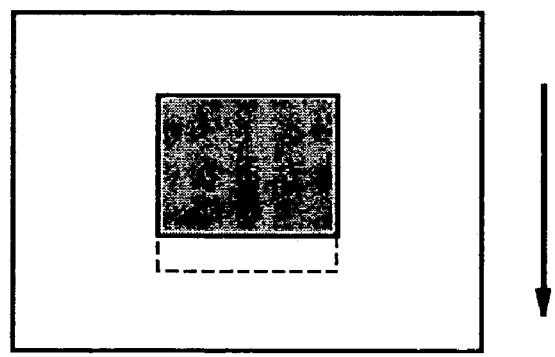

PIXEL b

PIXEL b

PIXEL b

R0: READ START POSITION

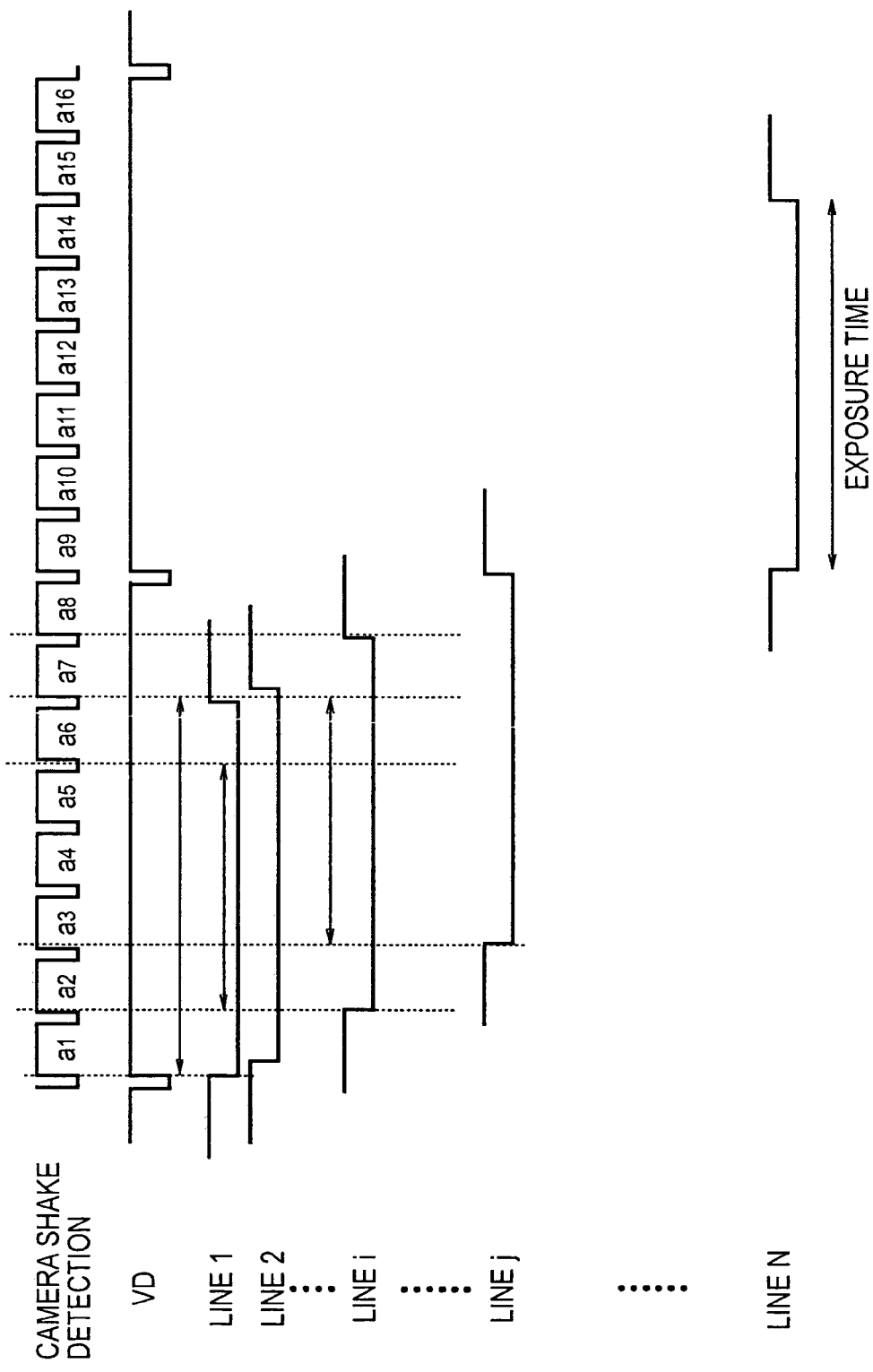

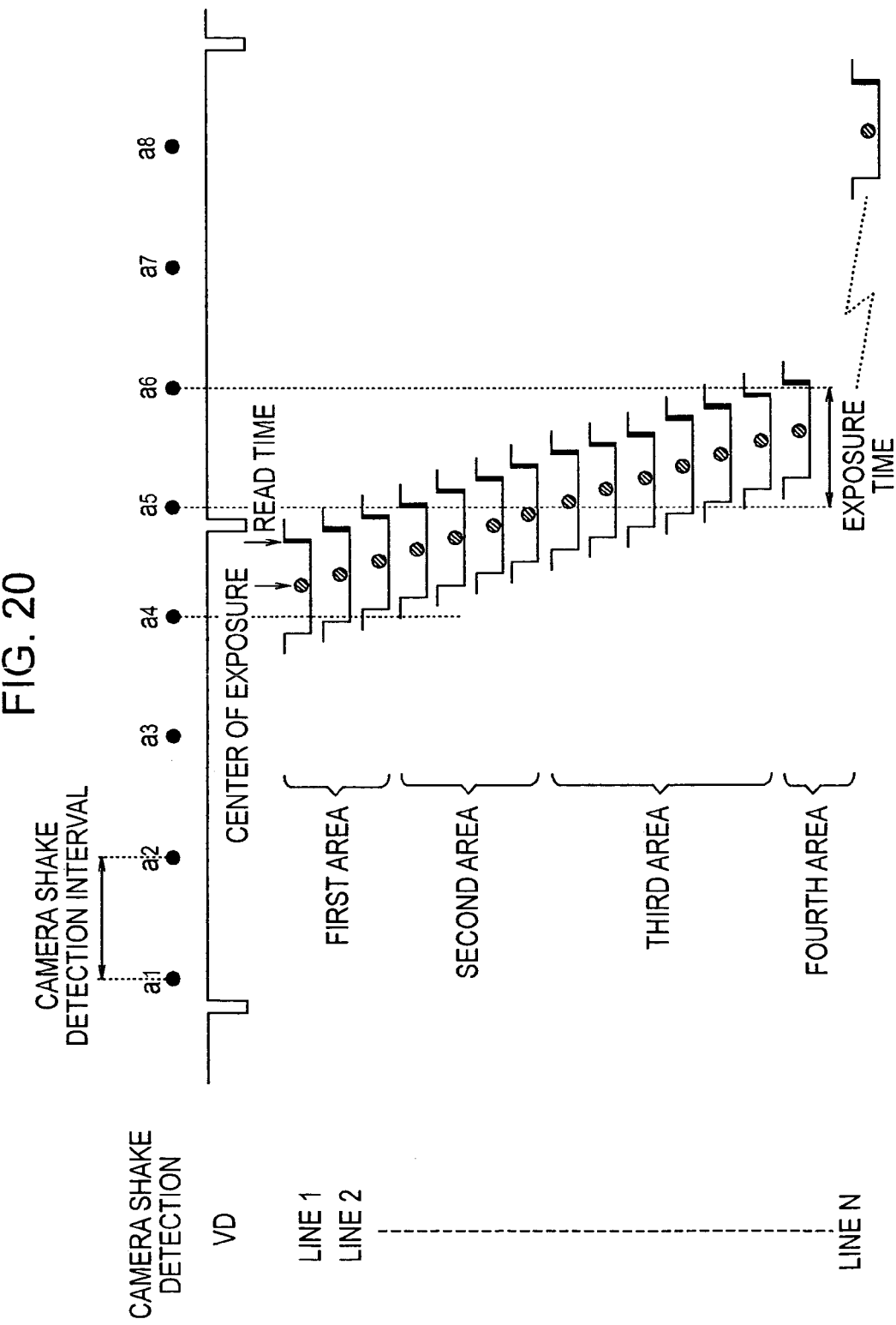

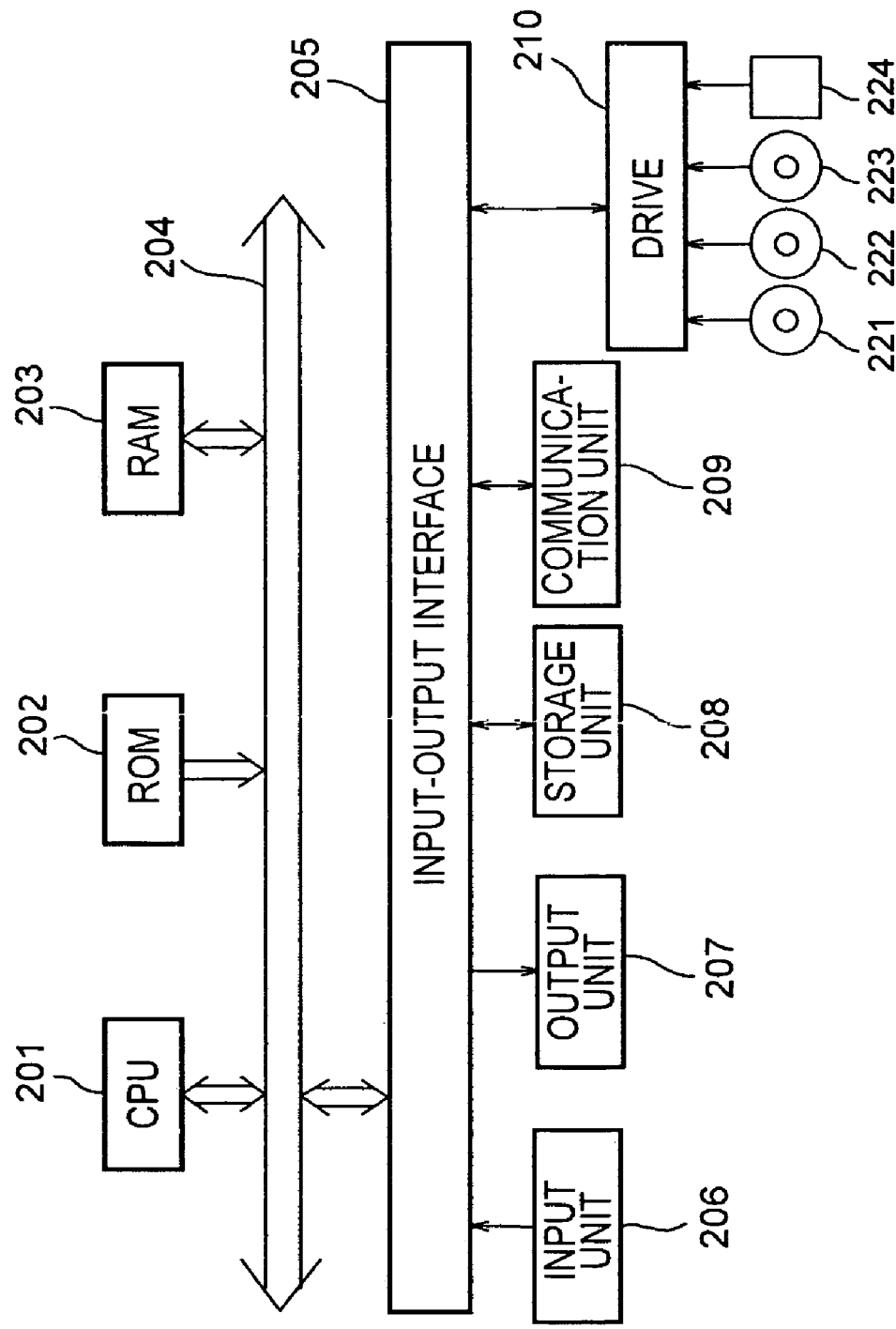

IMAGE PROCESSING APPARATUS AND METHOD, RECORDING MEDIUM, AND PROGRAM FOR CORRECTING CAMERA SHAKE

TECHNICAL FIELD

The present invention relates to an image processing apparatus and method, a recording medium, and a program and, more particularly, to an image processing apparatus and method for reducing the effects of camera shake in shooting through a portable imaging apparatus, a recording medium, and a program.

BACKGROUND ART

Portable video cameras are coming into common use. Solid-state imaging devices used in common video cameras include charge-transfer solid-state imaging devices, typified by a CCD (Charge Coupled Device) sensor, and X-Y addressing solid-state imaging devices, typified by a CMOS (Complementary Metal Oxide Semiconductor) sensor.

The CMOS sensor has lower power consumption than the CCD sensor. Further, the CMOS sensor is driven by a single low voltage supply and is easily integrated with a peripheral circuit. Accordingly, incorporating the CMOS sensor into an image processing apparatus such as a video camera is under consideration.

It is, however, difficult to record a high-quality moving image or still image using the CMOS sensor as an imaging device of an image processing apparatus such as a video camera. As one of the reasons, a captured image is distorted by camera shake. For the CCD sensor which has already been used as an imaging device of an image processing apparatus, a single value calculated based on camera shake information obtained in one field or one frame is used as a correction required to execute a process of reducing the effects of camera shake. Since exposure time for all pixels is uniform, an image is not distorted. Therefore, shifts caused by camera shake can be corrected using the single value.

On the other hand, the CMOS sensor captures the image of a subject and processes the captured image according to the following mechanism. The image is distorted by camera shake. The distortion may be caused by the following reason.

In the charge-transfer solid-state imaging device such as the CCD sensor, all pixels are simultaneously exposed, so that pixel data can be read out. In the X-Y addressing solid-state imaging device such as the CMOS sensor, data is read out every pixel or data is sequentially read out every line. In the solid-state imaging device, when data is sequentially read out every pixel, the difference in read time between pixels in one line is negligibly smaller than that between lines. In the following description, as shown in FIG. 1, the difference in read time between lines will be considered.

For example, a CMOS sensor will now be described. The sensor has a structure in which, as shown in FIG. 1, read time for all pixels is $1/60$ seconds and each frame includes lines 1 to N. Referring to FIG. 2, time t1 is the start of exposing the line 1 and time t2 is the end thereof. Time t3 is the end of exposing the line 2. Time t4 is the end of exposing the line 3.

The difference between time t2 and time t3 corresponds to time difference $\Delta t$. The difference between time t3 and time t4 also corresponds to the time difference $\Delta t$. In other words, the time difference $\Delta t$ occurs every line with respect to exposure time. In this case, therefore, the time difference between the top line 1 and the bottom line N in one frame is approximately $1/60$ seconds corresponding to the exposure time. When camera shake is given under condition that the exposure time of the bottom line N is delayed from that of the top line 1 in reading one frame, unfortunately, the image of a subject is distorted due to the differences in exposure time between lines.

The problem in that the captured image of a subject is distorted will now be described with reference to FIGS. 3 and 4. FIGS. 3 and 4 show examples of a case where a stationary rectangle is captured as a subject in the center of a frame. The middle diagram of FIG. 3 shows a normal image without being distorted, the image being obtained by shooting the subject through an image processing apparatus without camera shake. The subject is captured as a rectangle.

The right diagram of FIG. 3 shows an image distorted by rightward movement of the image processing apparatus in shooting the subject. Similarly, the left diagram of FIG. 3 shows an image distorted by leftward movement of the image processing apparatus in shooting the subject.

The middle diagram of FIG. 4 shows a normal image without being distorted, the image being obtained by shooting the subject through the image processing apparatus without camera shake. The subject is captured as a rectangle. The upper diagram of FIG. 4 shows an image extended vertically by upward movement of the image processing apparatus in shooting the subject. The lower diagram of FIG. 4 shows an image contracted vertically by downward movement of the image processing apparatus in shooting the subject.

As mentioned above, in the CMOS sensor, exposure time is shifted (i.e., imaging timing is delayed) every line. If shifts caused by camera shake are corrected using a single value calculated from camera shake information obtained in one field or one frame, the effects of camera shake cannot completely be eliminated. Unfortunately, an image to be given to a user may be distorted.

To correct image distortion caused by camera shake, an image processing apparatus for changing a read position every line in order to correct shifts in the horizontal direction and changing the position of a line to be read in the vertical direction in order to correct shifts in the vertical direction is proposed (refer to, e.g., Japanese Unexamined Patent Application Publication No. 2001-358999).

According to a method disclosed in Japanese Unexamined Patent Application Publication No. 2001-358999, it is assumed that camera shake information is obtained every line constituting a frame. Disadvantageously, it is difficult to obtain camera shake information every line in terms of the sampling frequency of a sensor for detecting camera shake.

In addition, according to the method disclosed in Japanese Unexamined Patent Application Publication No. 2001-358999, unfortunately, shifts caused by camera shake are corrected in units of pixels.

It is necessary for conventional image processing apparatuses to temporarily store image data of a captured image. Accordingly, the conventional image processing apparatus requires a memory having a capacity capable of storing data of at least one frame. Therefore, the memory capacity cannot be reduced.

DISCLOSURE OF INVENTION

The present invention is made in consideration of the above circumstances and it is an object of the present invention to generate a correction every line on the basis of camera shake information obtained in one field or one frame to correct shifts caused by camera shake with high accuracy. It is another object of the present invention to determine coefficients for pixel interpolation on the basis of camera shake information to produce pixel data for interpolation, thus correcting shifts caused by camera shake with higher accuracy. It is further another object to perform camera shake detection for a short time to reduce the capacity of a memory to store image data.

The present invention provides an image processing apparatus including: imaging means for capturing an image through an X-Y addressing solid-state imaging device; output means for detecting given vibration to generate vibration detection information; converting means for converting the vibration detection information generated from the output means into shifts indicating the magnitudes of the given vibration; calculating means for calculating corrections from the shifts obtained by the converting means, the corrections being used to reduce the effects of the given vibration on the image; interpolating means for interpolating the shifts or the corrections; and correcting means for correcting pixels constituting the image, captured by the imaging means, on the basis of the corrections to output an image composed of the corrected pixels, wherein the converting means converts the vibration detection information into a first shift and a second shift, the first shift being obtained when a first line is imaged, the second shift being obtained when a second line is imaged, the interpolating means interpolates the first and second shifts to obtain a shift of each line between the first and second lines, and the calculating means calculates a correction every line on the basis of the corresponding shift obtained by the interpolating means, or wherein the converting means converts the vibration detection information into a first shift and a second shift, the first shift being obtained when a first line is imaged, the second shift being obtained when a second line is imaged, the calculating means calculates a first correction and a second correction from the first shift and the second shift, respectively, and the interpolating means interpolates the first and second corrections to obtain a correction of each line between the first and second lines.

On the basis of the corrections, the correcting means may generate corrected pixels using pixel data of pixels in the image captured by the imaging means, the image corresponding pixels located in corrected positions.

The converting means may generate each shift on the basis of the middle information piece and the previous and subsequent information pieces of the vibration detection information pieces generated from the output means for a predetermined time.

The converting means is capable of predicting future vibration information based on past vibration information.

While one image is captured, the calculating means may generate a shift once or more times from the converting means, or calculate a correction once or more times from the correcting means.

Each of the shift obtained by the converting means and the correction obtained by the calculating means may include a value corresponding to one pixel or smaller.

The correcting means may interpolate pixels with an accuracy of one pixel or smaller.

The image processing apparatus may further include storage means for storing only data of the image captured by the imaging means, the data being required to correct the image in the vertical direction through the correcting means.

An area needed to correct shifts of the image may be stored instead of one image.

The present invention provides an image processing method including: an imaging control step of controlling an X-Y addressing solid-state imaging device to capture an image; a detection step of detecting given vibration; a conversion step of converting vibration detection information regarding the vibration detected in the detection step into shifts indicating the magnitudes of the given vibration; a calculation step of calculating corrections based on the shifts obtained in the conversion step to reduce the effects of the given vibration on the image; an interpolation step of interpolating the shifts or the corrections; and a correction step of correcting the image, captured under control in the imaging control step, on the basis of the corrections to generate the corrected image, wherein the vibration detection information is converted into a first shift and a second shift in the conversion step, the first shift being obtained when a first line is imaged, the second shift being obtained, the first and second shifts are interpolated to obtain a shift of each line between the first and second lines in the interpolation step, and a correction of each line is calculated in the calculation step on the basis of the corresponding shift obtained in the interpolation step, or wherein the vibration detection information is converted into a first shift and a second shift in the conversion step, the first shift being obtained when a first line is imaged, the second shift being obtained when a second line is imaged, a first correction and a second correction are calculated from the first shift and the second shift, respectively, in the calculation step, and the first and second corrections are interpolated to obtain a correction of each line between the first and second lines in the interpolation step.

The present invention provides a recording medium storing a program for an image processing apparatus which corrects an image captured through an X-Y addressing solid-state imaging device to reduce the effects of given vibration on the image, the program including: an imaging control step of controlling the imaging device to capture an image; a detection step of detecting given vibration; a conversion step of converting vibration detection information regarding the vibration detected in the detection step into shifts indicating the magnitudes of the given vibration; a calculation step of calculating corrections in units of pixels on the basis of the shifts obtained in the conversion step, the corrections being used to reduce the effects of the given vibration on the image; an interpolation step of interpolating the shifts or the corrections; and a correction step of correcting the image, captured under control in the imaging control step, on the basis of the corrections to generate the corrected image, wherein the vibration detection information is converted into a first shift and a second shift in the conversion step, the first shift being obtained when a first line is imaged, the second shift being obtained when a second line is imaged, the first and second shifts are interpolated to obtain a shift of each line between the first and second lines in the interpolation step, and a correction of each line is calculated in the calculation step on the basis of the corresponding shift obtained in the interpolation step, or wherein the vibration detection information is converted into a first shift and a second shift in the conversion step, the first shift being obtained when a first line is imaged, the second shift being obtained when a second line is imaged, a first correction and a second correction are calculated from the first shift and the second shift, respectively, in the calculation step, and the first and second corrections are interpolated to obtain a correction of each line between the first and second lines in the interpolation step.

The present invention provides a program including: an imaging control step of controlling an X-Y addressing solid-state imaging device to capture an image; a detection step of detecting given vibration; a conversion step of converting vibration detection information regarding the vibration detected in the detection step into shifts indicating the magnitudes of the given vibration; a calculation step of calculating corrections in units of pixels on the basis of the shifts obtained in the conversion step, the corrections being used to reduce the effects of the given vibration on the image; an interpolation step of interpolating the shifts or the corrections; and a correction step of correcting the image, captured under control in the imaging control step, on the basis of the corrections to generate the corrected image, wherein the vibration detection information is converted into a first shift and a second shift in the conversion step, the first shift being obtained when a first line is imaged, the second shift being obtained when a second line is imaged, the first and second shifts are interpolated to obtain a shift of each line between the first and second lines in the interpolation step, and a correction of each line is calculated in the calculation step on the basis of the corresponding shift obtained in the interpolation step, or wherein the vibration detection information is converted into a first shift and a second shift in the conversion step, the first shift being obtained when a first line is imaged, the second shift being obtained when a second line is imaged, a first correction and a second correction are calculated from the first shift and the second shift, respectively, in the calculation step, and the first and second corrections are interpolated to obtain a correction of each line between the first and second lines in the interpolation step.

According to the present invention, on the basis of information relating to given vibration, correction needed for correction to cancel out the vibration is obtained every line constituting a frame by calculation and interpolation.

BRIEF DESCRIPTION OF THE DRAWINGS

FIG. 4 includes diagrams explaining the distortion of a subject image caused by camera movement.

FIG. 19 is a timing chart explaining information required to calculate a shift.

FIG. 20 is a diagram explaining information required to calculate a shift.

FIG. 22 is a diagram explaining a medium.

BEST MODE FOR CARRYING OUT THE INVENTION

Figure 5:
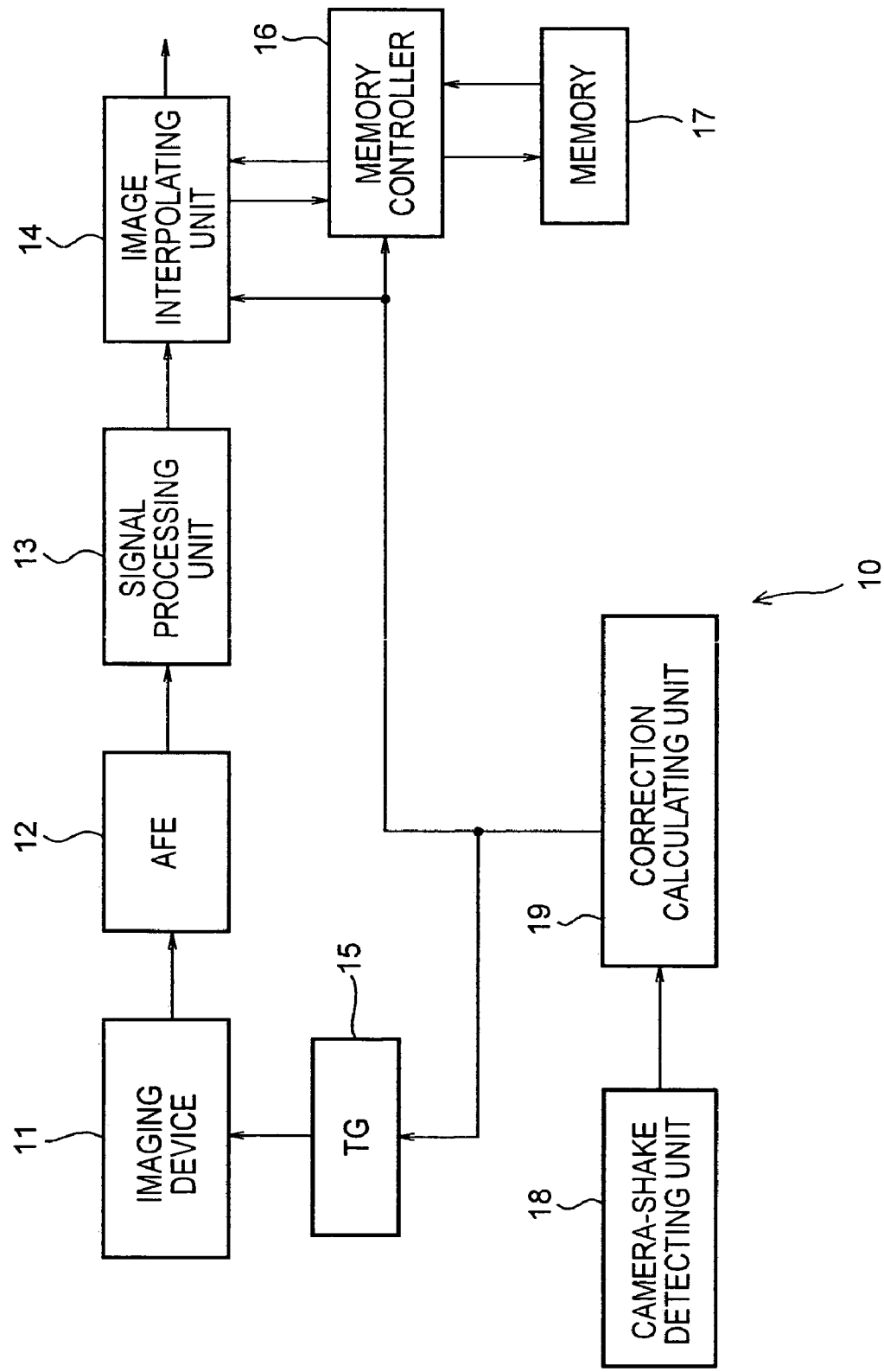
FIG. 5 is a block diagram of the structure of an image processing apparatus according to an embodiment of the present invention.

An embodiment of the present invention will now be described below with reference to the drawings. FIG. 5 is a block diagram of the structure of an image processing apparatus according to one embodiment of the present invention. An image processing apparatus 10 includes an imaging device 11 which is, e.g., an X-Y addressing solid-state imaging device (such as a CMOS image sensor). Data of the image of a subject captured by the imaging device 11 is supplied to an AFE (Analog Front End) 12.

The AFE 12 converts the supplied image data into digital image data and then supplies the resultant data into a signal processing unit 13. The signal processing unit 13 calculates a luminance signal and a color-difference signal from the supplied image data and then supplies the calculated signals to an image interpolating unit 14.

Although the image data supplied to the image interpolating unit 14 corresponds to data pieces of the subject image captured by the imaging device 11, all of the data pieces of the image captured by the imaging device 11 are not supplied to the image interpolating unit 14. Only data pieces read at timing generated by a TG (Timing Generator) 15 are supplied to the image interpolating unit 14.

The data supplied to the image interpolating unit 14 is temporarily stored in a memory 17 under the control of a memory controller 16. On the other hand, data stored in the memory 17 is read according to an instruction of the memory controller 16 and is then supplied to the image interpolating unit 14. In the image interpolating unit 14, the supplied data is subjected to an interpolation process, which will be described in detail below, of correcting shifts caused by camera shake. The resultant data is output from the image interpolating unit 14 to a recording medium (not shown) or a display (not shown) in order to record or display the data.

As vibration given to the image processing apparatus 10, user camera shake will be described as an example. Even when vibration other than camera shake is given, the present invention can be applied in that case.

The image interpolating unit 14, the TG 15, and the memory controller 16 control the respective operations on the basis of corrections calculated by a correction calculating unit 19, the correction being obtained based on a shift obtained by a camera-shake detecting unit 18.

The camera-shake detecting unit 18 detects camera shake given to the image processing apparatus 10 in shooting. A method using a sensor such as an angular rate sensor or a sensorless camera-shake detecting method based on image processing is used for camera shake detection. For example, when the camera-shake detecting unit 18 includes an angular rate sensor, the angular rate sensor supplies data indicating an angular rate in the pitching direction and data indicating an angular rate in the yawing direction to the correction calculating unit 19.

On the basis of the detected shift caused by camera shake, the correction calculating unit 19 calculates data indicating a correction used to correct a shift caused by camera shake. In other words, the correction calculating unit 19 calculates a correction indicating the number of pixels, by which an image is moved to reduce the effects of given camera shake, every line using the supplied data.

Figure 1:
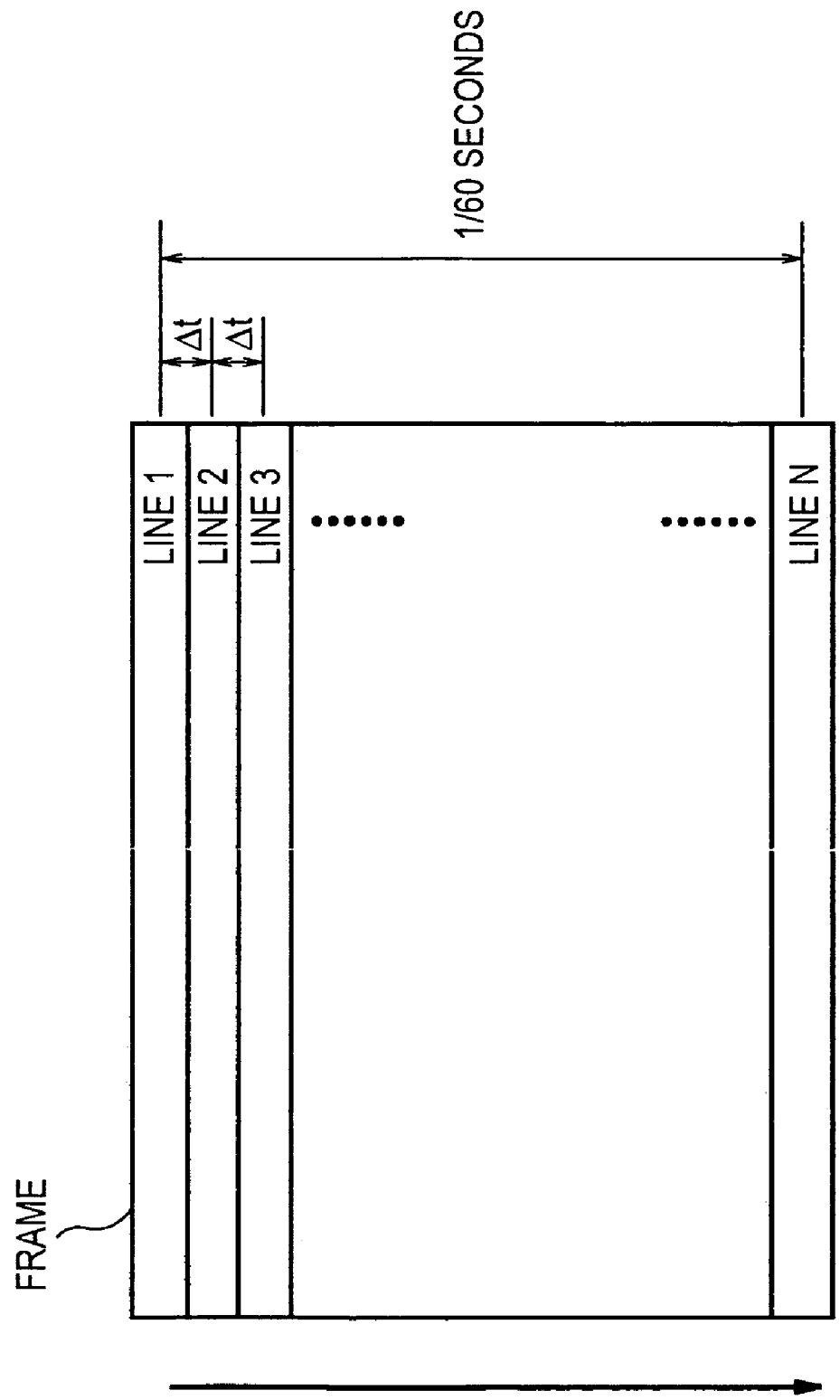
FIG. 1 is a diagram explaining the readout of image data from an X-Y addressing imaging device.
Figure 2:
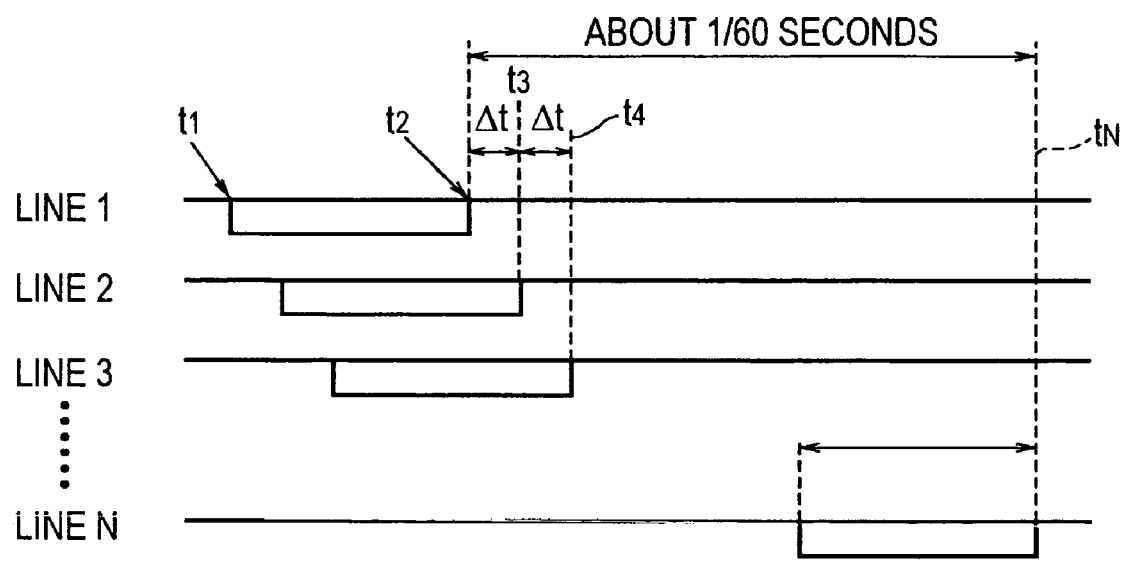
FIG. 2 is a diagram explaining the differences in readout between lines.
Figure 3:
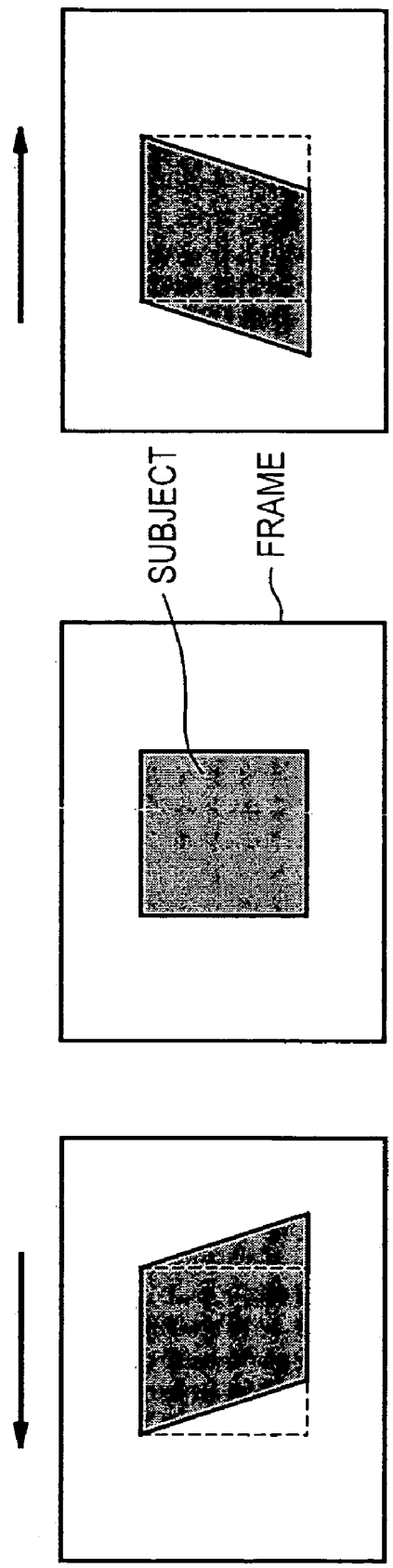
FIG. 3 includes diagrams explaining the distortion of a subject image caused by camera movement.

As mentioned above with reference to FIGS. 1 and 2, image data is sequentially read every line in a solid-state imaging device such as a CMOS image sensor. Therefore, a correction is calculated every line.

It is necessary to calculate a correction every line. Timing, when data indicating a shift is obtained, depends on the sampling frequency of the camera-shake detecting unit 18. Data indicating a shift required to calculate a correction is not always supplied every line.

It is assumed that the sampling frequency of the camera-shake detecting unit 18 is different from a data reading frequency for each line of an image captured by the imaging device 11. To obtain a correction every line, it is necessary to interpolate data of the sampling points of the camera-shake detecting unit 18 by any means to obtain corrections while calculation is not performed based on the data indicating a shift supplied from the camera-shake detecting unit 18.

It is assumed that the sampling frequency of the camera-shake detecting unit 18 matches the data reading frequency for each line of an image captured by the imaging device 11 but the frequencies are out of phase. To obtain a correction every line, it is necessary to interpolate data indicating corrections between the sampling points of the shake detecting unit 18.

Figure 6:
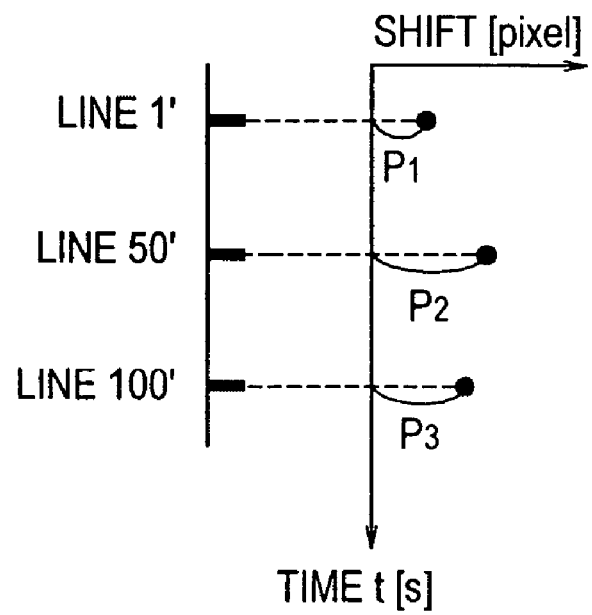
FIG. 6 is a diagram explaining shifts.

The interpolation of data indicating corrections will now be described. As an example, it is assumed that camera shake detection (timing when data indicating a shift is supplied from the camera-shake detecting unit 18 to the correction calculating unit 19) is performed three times while 100 lines are read. For convenience of explanation, it is assumed that a shift detected by the camera-shake detecting unit 18 can be obtained in each of lines 1', 50', and 100' as shown in FIG. 6. The line 1' serving as a reference line in the explanation is one of lines constituting a captured image.

Referring to FIG. 6, a shift in reading the line 1' corresponds to pixels P1, that in reading the line 50' corresponds to pixels P2, and that in reading the line 100' corresponds to pixels P3.

A shift is a value obtained by converting information supplied from the camera-shake detecting unit 18 into a value in units of pixels through the correction calculating unit 19. A shift obtained by the correction calculating unit 19 includes a fraction of one pixel. In the subsequent processing steps, a shift can be corrected by one pixel or smaller.

The shifts P1 to P3 denote differences relative to a reference shift obtained at predetermined timing. The predetermined timing is, e.g., just after the start of capturing an image. Referring to FIG. 6, rightward movement occurs between the reference and the line 1'. After that, rightward movement occurs between the lines 1' and 50'. Then, leftward movement occurs between the lines 50' and 100'.

Figure 7:
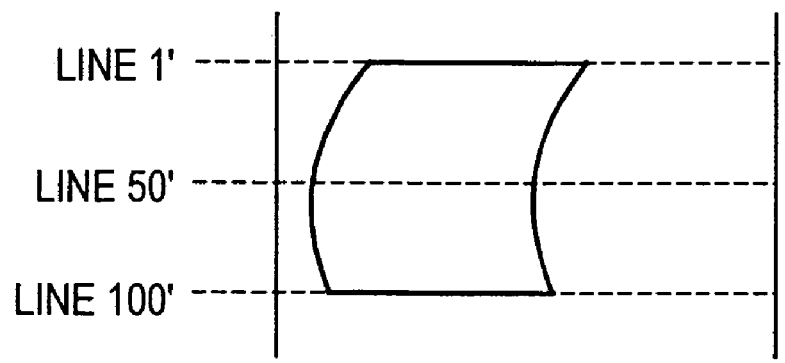
FIG. 7 is a diagram explaining the distortion of a subject image caused by camera shake.

For instance, it is assumed that a stationary rectangle is captured as a subject. When camera shake causing shifts in FIG. 6 is given to the image processing apparatus 10, an image shown in FIG. 7 is captured (provided to the user) unless data is corrected. Shifts caused by camera shake are corrected so that the distorted image is corrected and the rectangle is ultimately provided as a rectangular image to the user.

In the present embodiment, an X-Y addressing solid-state imaging device such as a CMOS image sensor is used as an example of the imaging device 11 (FIG. 5). Assuming that a charge-transfer solid-state imaging device such as a CCD image sensor is used as the imaging device 11, a single value is used to correct an image distorted by camera shake every line in a frame. A system according to the present invention can be applied in that case (the same value is used in one frame).

In order to correct a shift every line, it is necessary to acquire a correction every line. Again referring to FIG. 6, however, only the shifts of the lines 1', 50', and 100' are acquired. The reason why discrete data is acquired is that the acquisition depends on the camera-shake detection timing (sampling frequency) of the camera-shake detecting unit 18. In this case, shifts of the lines 2' to 49' and those of the lines 51' to 99' are not obtained. It is, therefore, necessary to obtain shifts of the respective lines by interpolation in order to execute the correction process.

An interpolation process (correction calculation process) of the correction calculating unit 19 will now be described with reference to a flowchart of FIG. 8. In step S11, the correction calculating unit 19 acquires data (camera-shake information used to calculate shifts) indicating shifts detected by the camera-shake detecting unit 18.

Figure 9A:
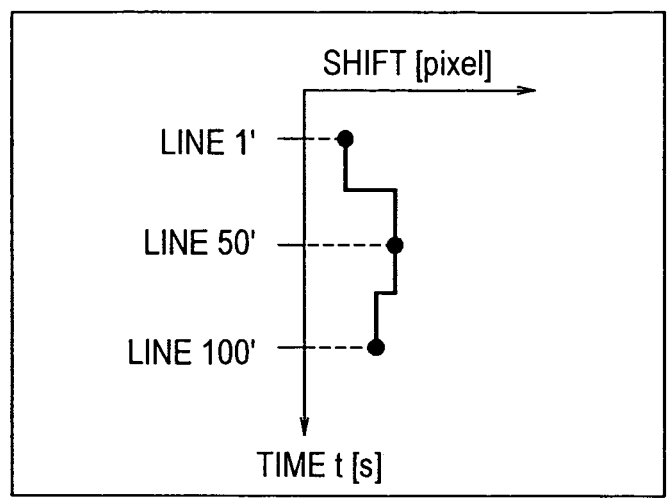
FIG. 9A is a diagram explaining the interpolation of the shifts.

As mentioned above, the correction calculating unit 19 acquires the three shifts in the lines 1' to 100'. In step S12, shifts in the lines 2' to 99' (excluding the line 50') are calculated on the basis of the three shifts. The calculation will now be described with reference to FIGS. 9A to 9C. Referring to FIG. 9A, for example, the shift regarding the line 1' is used for the lines 2' to 40', that regarding the line 50' is used for the lines 41' to 60', and that regarding the line 100' is used for the lines 61' to 99'. In other words, a method for applying a shift regarding one line to the previous and following lines to perform interpolation can be used.

Figure 9B:
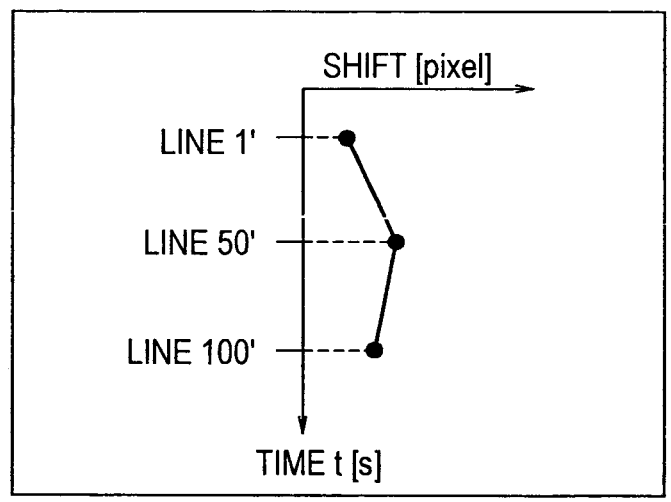
FIG. 9B is a diagram explaining the interpolation of the shifts.

Referring to FIG. 9B, the shifts can be obtained using a linear function. In an example of FIG. 9B, the shifts regarding the lines 2' to 49' are calculated according to a linear function based on the two shifts regarding the lines 1' and 50'. The shifts regarding the lines 51' to 99' are obtained according to a linear function based on the two shifts regarding the lines 50' and 100'.

Figure 9C:
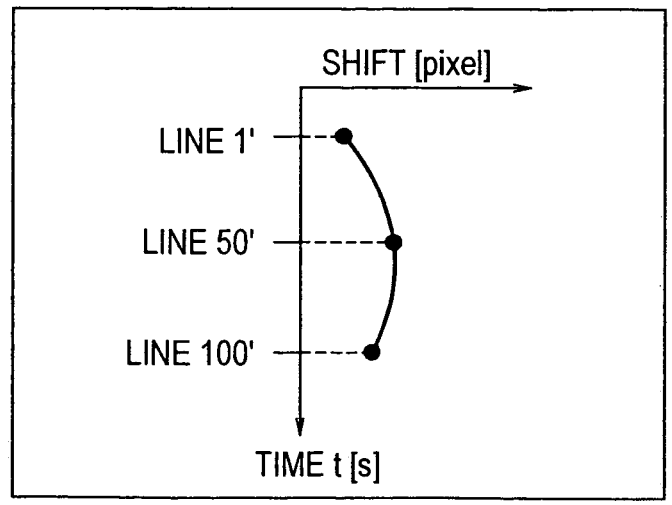
FIG. 9C is a diagram explaining the interpolation of the shifts.

In addition, referring to FIG. 9C, the shifts can be calculated using another function that is not a linear function. An example shown in FIG. 9C is fundamentally similar to that of FIG. 9B, except that a function other than a linear function is used. Generally, camera shake does not occur in the same direction at the same speed with the same magnitude. Accordingly, if interpolation is performed using a linear function that has a constant rate of change, an error may occur. To more appropriately perform interpolation (correction) with higher accuracy, a function representing a curve as shown in FIG. 9C is preferably used.

Which of the methods shown in FIGS. 9A to 9C is used to calculate corrections is determined by the throughput of the correction calculating unit 19. When the correction calculating unit 19 includes a microcomputer, the corrections can be calculated (interpolated) using any one of the methods of FIGS. 9A to 9C in accordance with the throughput of the microcomputer.

Specifically, if the throughput of the correction calculating unit 19 is low, the corrections can be calculated (interpolated) according to the method with a small calculation amount shown in FIG. 9A. When the throughput of the correction calculating unit 19 is relatively high, the corrections can be calculated (interpolated) according to the method with a relatively large calculation amount shown in FIG. 9C.

As mentioned above, after the shift is obtained every line on the basis of the discrete shifts, corrections are calculated in step S13. A correction is a value in units of pixels indicating how corrected the corresponding shift is to cancel out the shift (reduce the effects of camera shake).

For example, as shown in FIG. 6, the shift regarding the line I' corresponds to the pixels P1. In order to cancel out the shift corresponding to the pixels P1, an amount with a same absolute value and a different sign, namely, pixels-P1 can be calculated as a correction.

Figure 10A:
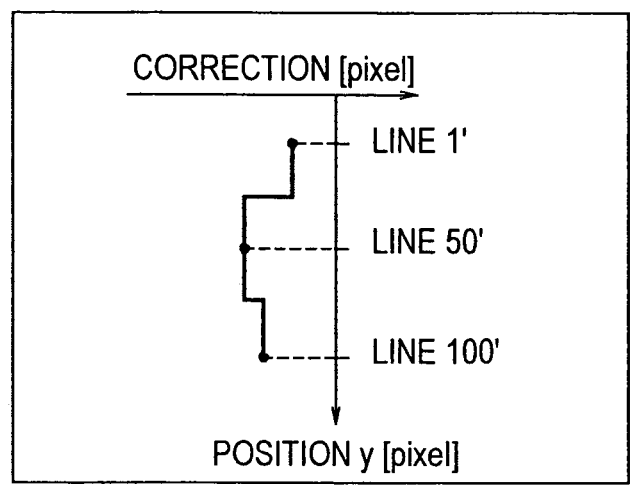
FIG. 10A is a diagram explaining corrections.
Figure 10B:
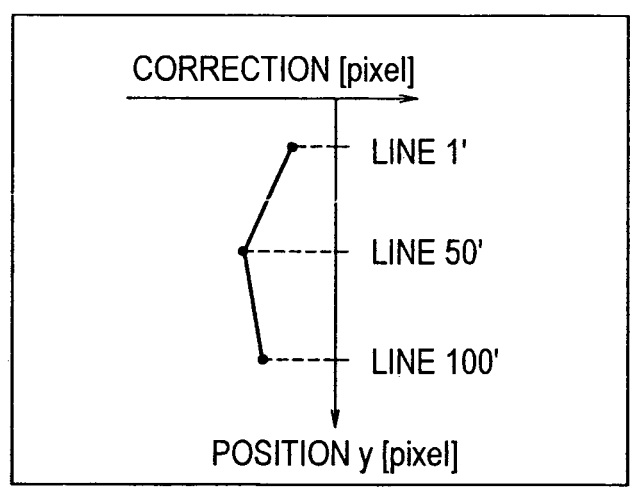
FIG. 10B is a diagram explaining the corrections.
Figure 10C:
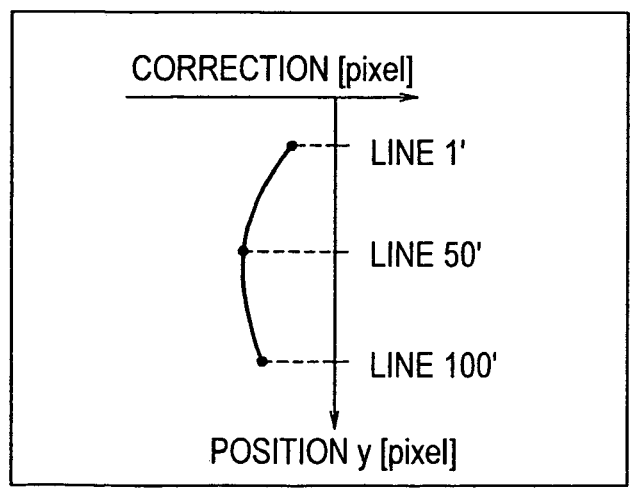
FIG. 10C is a diagram explaining the corrections.

FIGS. 10A to 10C are graphs showing corrections calculated by the correction calculating unit 19. FIG. 10A shows the corrections calculated when the correction calculating unit 19 interpolates the shifts according to the method described with reference to FIG. 9A. FIG. 10B shows the corrections calculated when the correction calculating unit 19 interpolates the shifts according to the method described with reference to FIG. 9B. FIG. 10C shows the corrections calculated when the correction calculating unit 19 interpolates the shifts according to the method described with reference to FIG. 9C.

Figure 8:
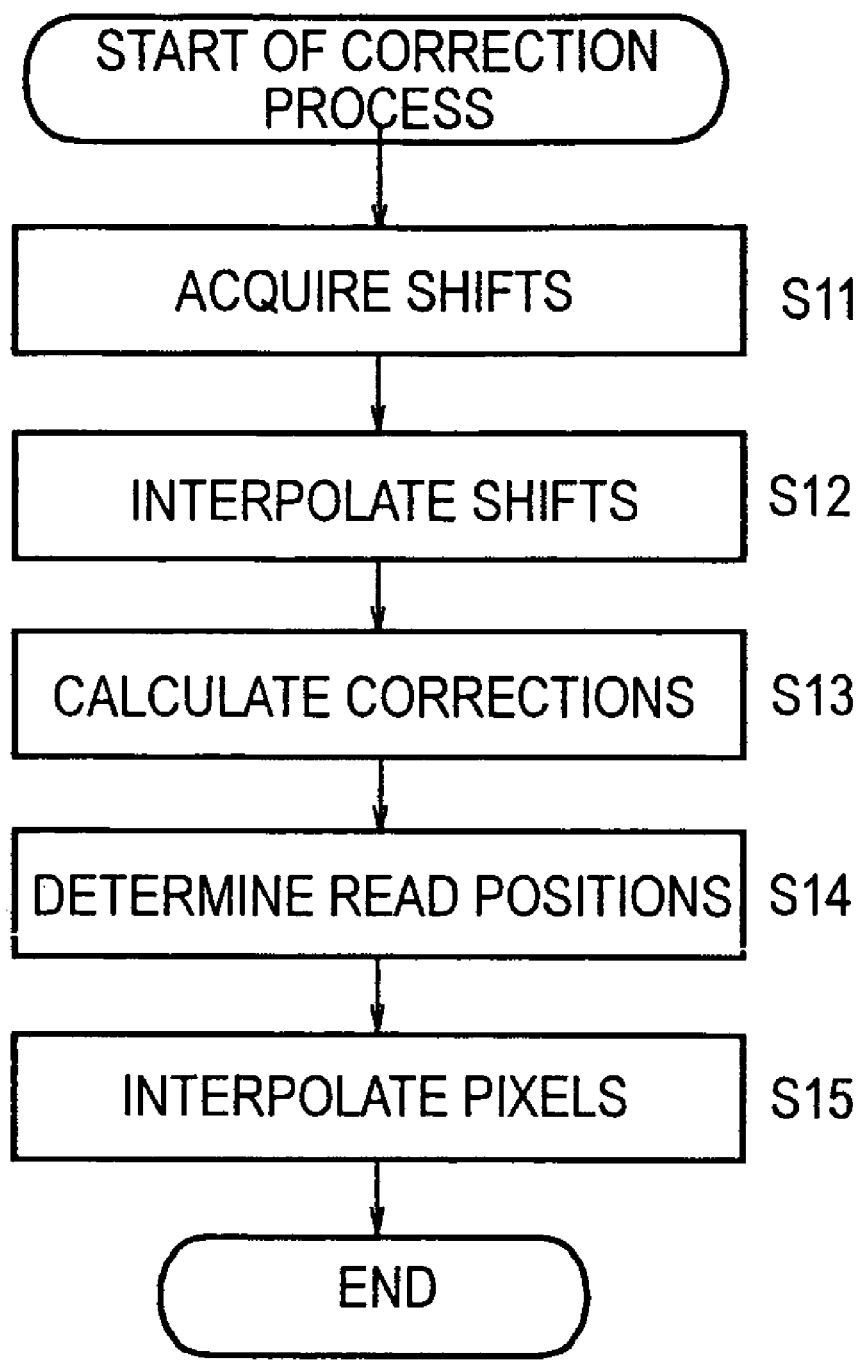
FIG. 8 is a flowchart explaining the operation of the image processing apparatus.

As mentioned above, after the corrections are calculated, read positions are determined in step 514 (FIG. 8). After the read position is determined, if two pixels are located in that position, a new pixel is obtained by interpolation in step S15. The determination of the read positions in step S14 and the pixel interpolation in step S15 will now be described. For convenience of explanation, steps S14 and S15 will be described below together. Step S14 and the previous steps are performed by the correction calculating unit 19 (FIG. 5) and step S15 is performed by the image interpolating unit 14.

Figure 11:
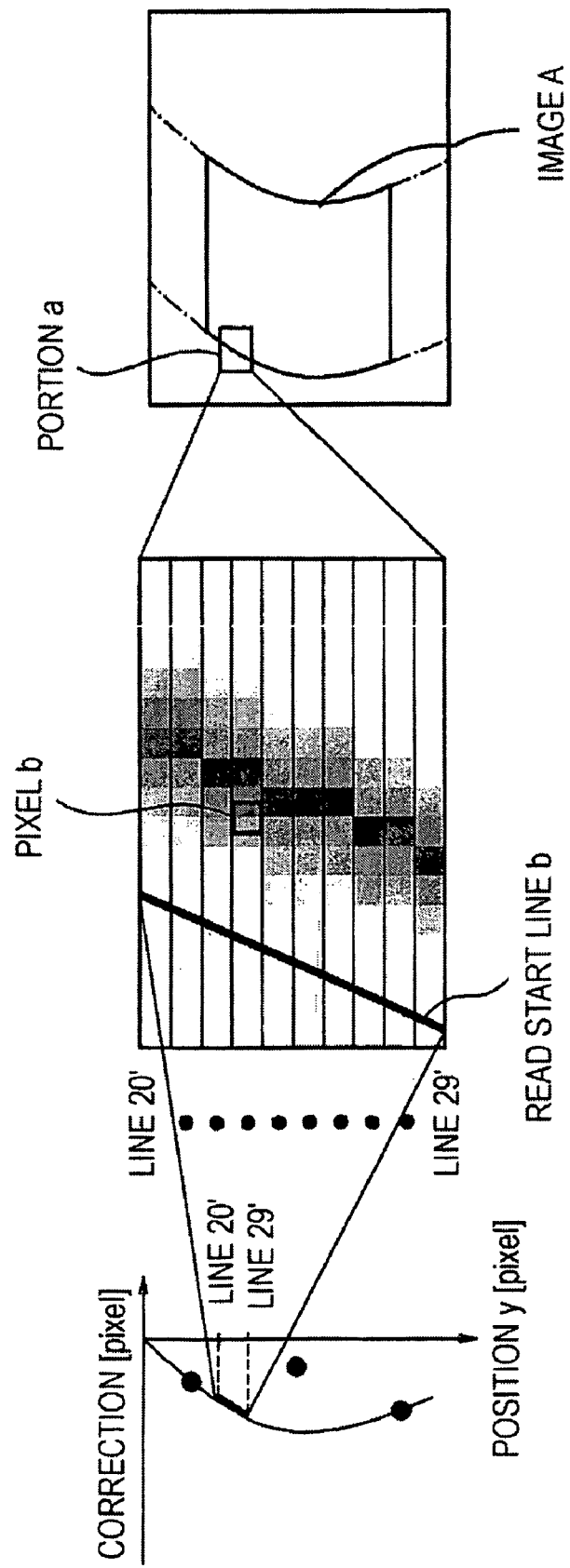
FIG. 11 is a diagram explaining read positions.

Referring to FIG. 11, the left part shows a graph of the corrections in the horizontal direction calculated by the correction calculating unit 19. The right part shows an example of an image A obtained when camera shake given upon capturing a rectangular subject is not corrected. The middle part shows an enlarged portion a of the image shown in the right part.

The portion a of the image A includes ten lines 20' to 29'. A pixel b to be read is located in the line 23'. A correction is calculated every line. A read start position in each line is determined on the basis of data indicating the correction of the corresponding line, namely, how many pixels are used to shift a read position.

The read start positions are plotted to form a read start line b as shown in the middle part of FIG. 11. The read start line b in the middle part of FIG. 11 is linear. However, it is not always linear. In some cases, the read start position of a predetermined line may be deviated from those of the other lines. The read start line b is shown for purposes of illustration. It is not a line formed as a result of the process of the correction calculating unit 19 or a line required to execute the process.

Figure 12:
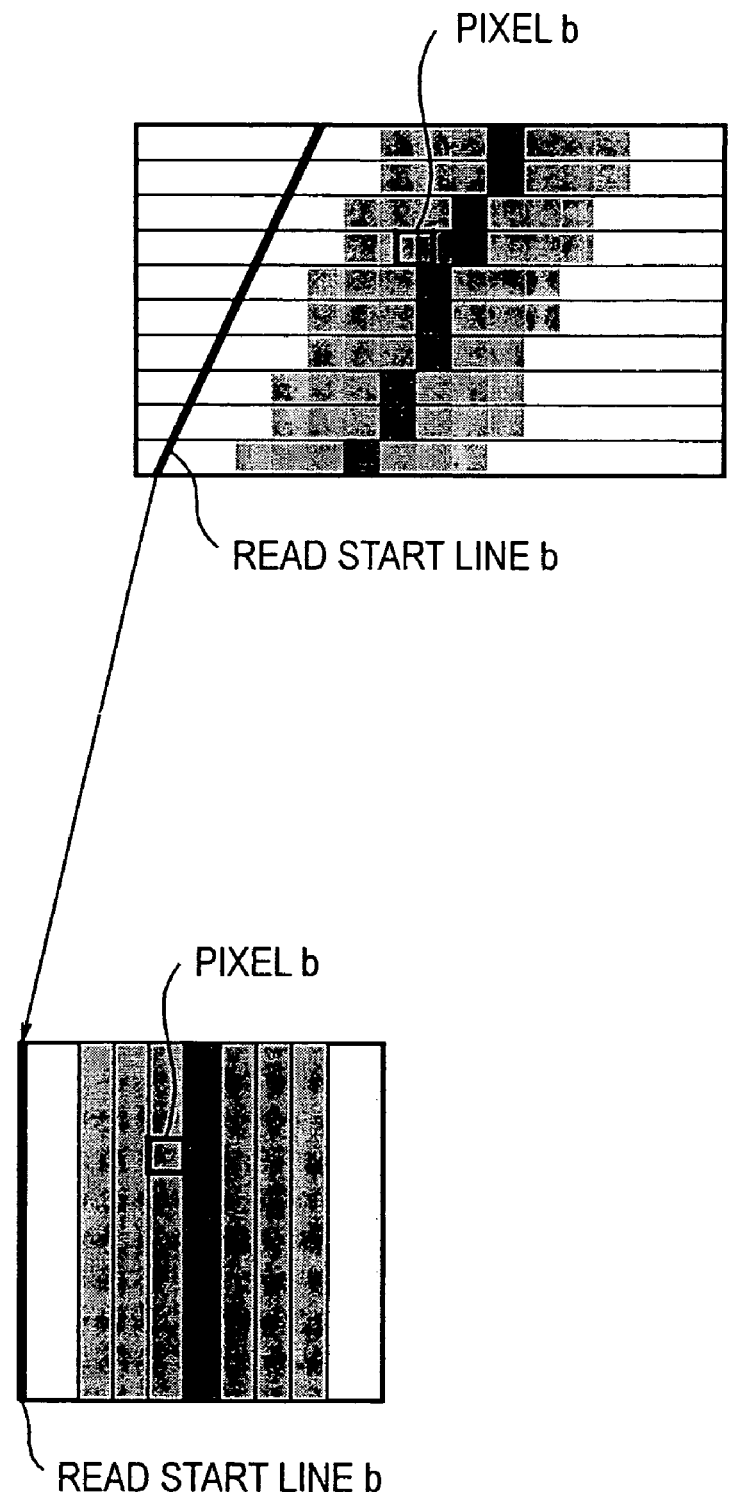
FIG. 12 is a diagram explaining readout.

Referring to FIG. 12, when readout is started along the read start line b, it is found that an image corresponding to the portion a serving as a segment of one side of the rectangle is corrected as a distortion-free image shown in the lower part of FIG. 12.

Figure 13A:
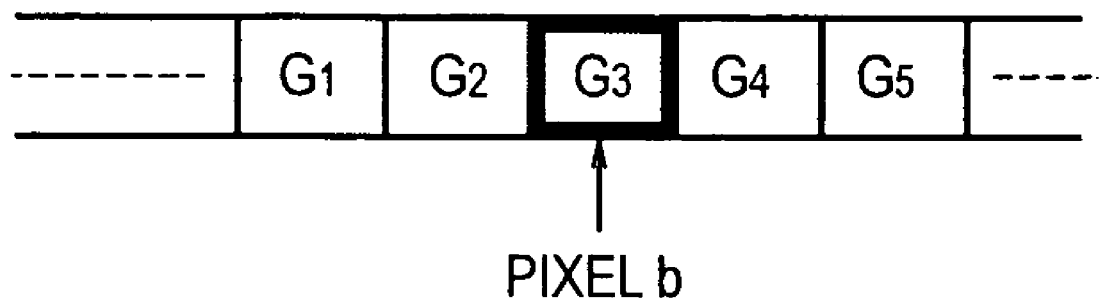
FIG. 13A is a diagram explaining pixel interpolation.

According to the present embodiment, a shift corresponding to one pixel or smaller can be corrected. When attention is paid to any one of the horizontal direction and the vertical direction, the pixel b to be read may be located in one pixel or two pixels. First, the case where attention is paid to the horizontal direction will be described. FIG. 13A shows an example in which the pixel b is located in one pixel. In this case of FIG. 13A, pixel data of a pixel G3 is read out as pixel data of the pixel b.

Figure 13B:
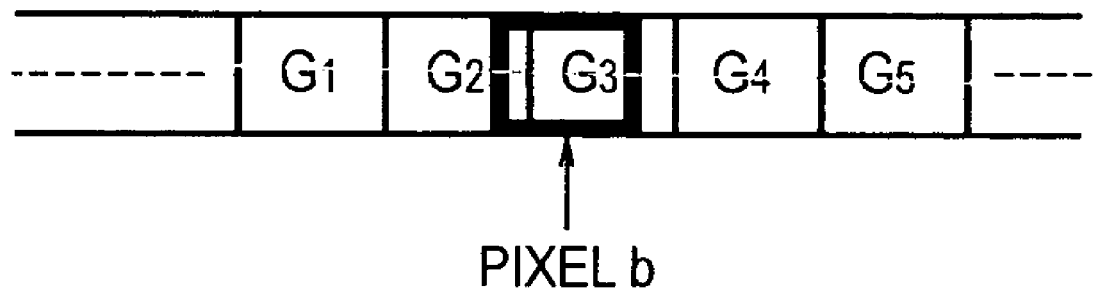
FIG. 13B is a diagram explaining pixel interpolation.

FIG. 13B shows an example in which the pixel b is located in two or more pixels. Referring to FIG. 13B, the pixel b is located over pixels G2 and G3. In this case, data of the pixel b is produced based on adjacent pixels and the resultant data is read as pixel data of the pixel b.

The case where data of the pixel b is produced based on adjacent pixels will now be described with reference to FIG. 13B. When the pixel b is located over the pixels G2 and G3, pixel data of the pixel b is produced using pixel data of the pixel G2 and that of the pixel G3. In this case, the pixel data of the pixel G2 is multiplied by the proportion of the total area of the pixel G2 to the area overlapped with the pixel b and the pixel data of the pixel G3 is multiplied by the proportion of the total area of the pixel G3 to the area overlapped with the pixel b, thus producing the pixel data of the pixel b.

For example, it is assumed that the pixel data of the pixel G2 is data D2, that of the pixel G3 is data D3, and the proportion of the total area of the pixel G2 to the area overlapped with the pixel b is Kb ($0<Kb<1$). The pixel data of the pixel b is calculated by the following expression. Pixel data of pixel b=$D2 \times Kb + D3 \times (1-Kb)$.

As mentioned above, the pixel data of the pixel b to be read can be produced by multiplying data of each of the pixels, which the pixel b overlaps, by the proportion of overlapping. Alternatively, the pixel data of the pixel b can be generated on the basis of data of pixels, which the pixel b does not overlap, in addition to the data of the overlapped pixels.

Referring to FIG. 13B, for example, the pixel data of the pixel b is produced using pixels G1 to G4. In this case, pixel data pieces (D1 to D4) of the pixels G1 to G4 are multiplied by respective coefficients (K1 to K4) uniquely obtained from the proportion of the pixel b overlapping the pixel G2. The resultant values are added. In other words, calculation is based on the following expression.

Data of pixel $b = D1 \times K1 + D2 \times K2 + D3 \times K3 + D4 \times K4$.

The image interpolating unit 14 or the correction calculating unit 19 stores the coefficients K1 to K4 in a table related to the proportion of the pixel b overlapping the pixel G2 (i.e., a value corresponding to a fraction of one pixel on condition that a correction includes a pixel segment corresponding to a fraction of one pixel (e.g., 0.5 when the calculated correction is 1.5 pixels)). The coefficients can be read from the table.

As mentioned above, when the pixel data of the pixel b is produced using a plurality of pixels, shifts caused by camera shake can be corrected with higher accuracy. If the pixel b is located at one pixel, the pixel data thereof can be produced on the basis of pixel data pieces of adjacent pixels.

In that manner, the process of determining a horizontal read position and the process of interpolating (producing) pixel data to be read as necessary are executed. A process of determining a vertical read position and a process of interpolating (producing) data of a pixel to be read as necessary will now be described. The processes for the vertical direction are fundamentally similar to the above-mentioned processes regarding the horizontal direction.

Figure 14:
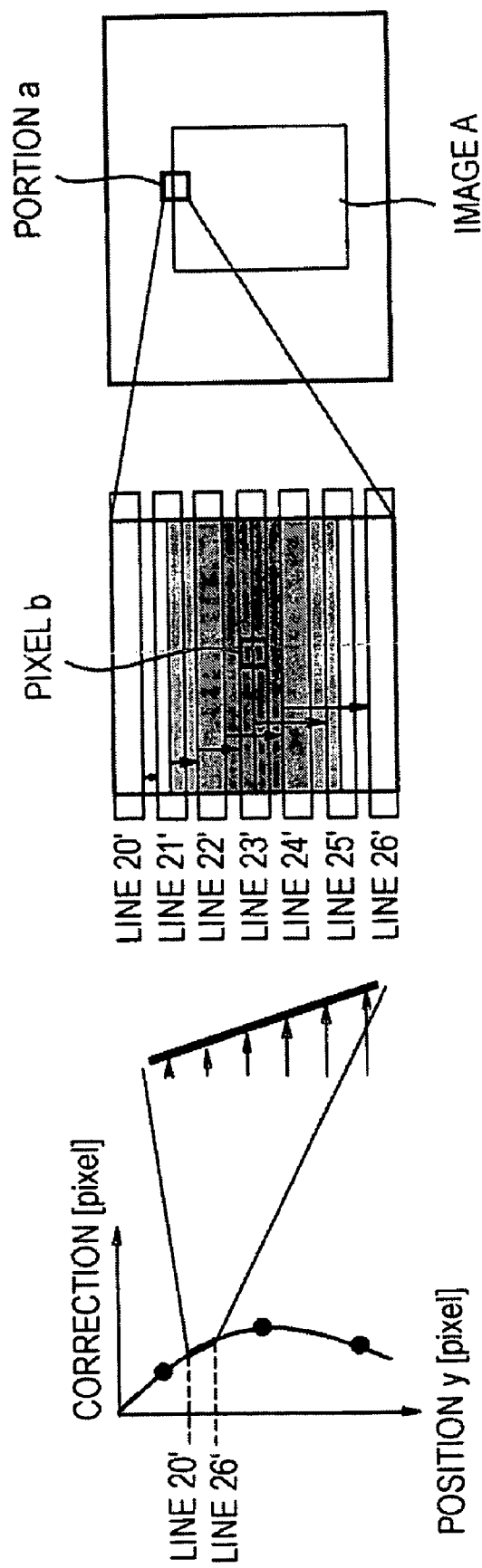
FIG. 14 is a diagram explaining readout.

Referring to FIG. 14, the left part includes a graph showing corrections in the vertical direction calculated by the correction calculating unit 19. The right part of FIG. 14 shows an example of an image A obtained by capturing a rectangular subject when the effects of upward camera movement are not corrected, the rectangular image being elongated. The middle part of FIG. 14 shows a diagram of an enlarged portion a of the image in the right part.

The portion a of the image A includes seven lines 20' to 26'. A pixel b to be read is located in the line 23'. In the middle part of FIG. 14, reference numerals are assigned to lines (below, referred to as original lines as appropriate) in which the image should be located upon capturing the subject without camera shake. For convenience of explanation, gaps between the lines are formed. In the example of FIG. 14, since the original lines do not coincide with lines of the captured image, the image is included in the gaps between the lines.

In the above-mentioned shift correction in the horizontal direction, a read start position in one line is shifted to correct a shift. In the shift correction in the vertical direction, a line itself is selected to correct a shift. In other words, a shift in the vertical direction is corrected in such a manner that data indicating how many pixels are used to shift a captured line upward or downward is calculated as a correction to obtain an original image captured without camera shake, and readout is performed based on the correction.

Figure 15A:
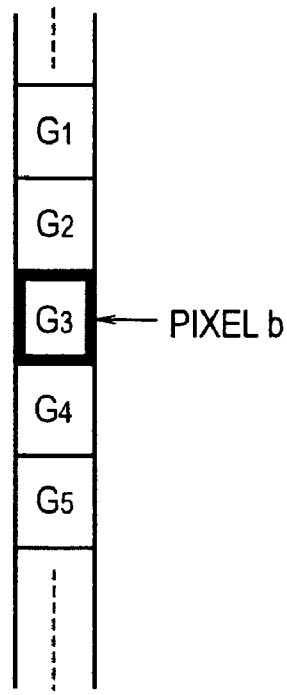
FIG. 15A is a diagram explaining pixel interpolation.
Figure 15B:
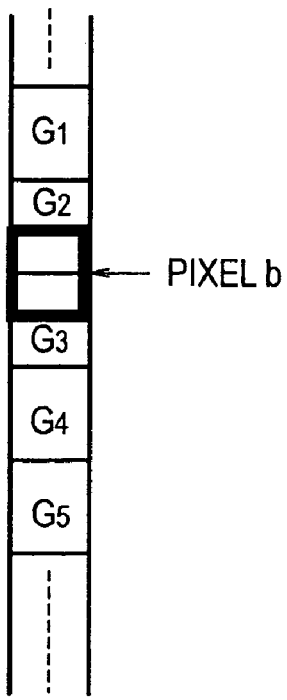
FIG. 15B is a diagram explaining pixel interpolation.

Similar to the shift correction in the horizontal direction, in the vertical correction, the pixel b to be read may be located in one pixel (line) as shown in FIG. 15A or a plurality of pixels (lines) as shown in FIG. 15B. Regarding an approach for generating pixel data of the pixel b when the pixel b is located over a plurality of pixels, since the pixel data can be calculated using coefficients in a manner similar to the shift correction in the horizontal direction described with reference to FIG. 13B, a description of the approach will be omitted.

Figure 16:
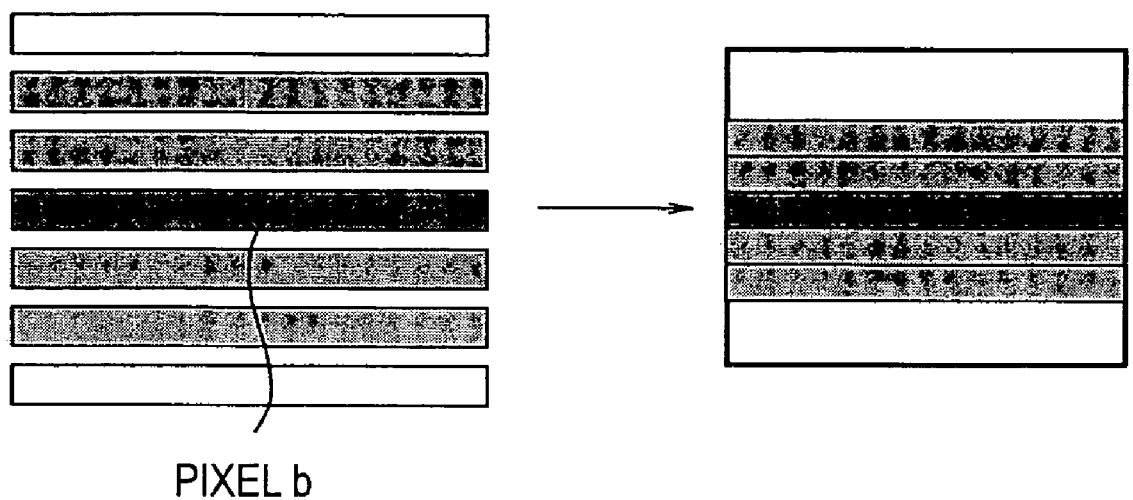
FIG. 16 is a diagram explaining an image including interpolated pixels.

After the above interpolation (correction) is performed, the lines of the captured image match the original lines as shown in the left part of FIG. 16. Consequently, as shown in the right part of FIG. 16, the captured image is corrected such that a portion serving as a segment of one side of the rectangle is located on the original line. As mentioned above, even when vertical camera shake is given in capturing an image, the effects of camera shake can be reduced and the resultant image can be provided to the user.

As mentioned above, according to the present embodiment, the shift correction in the horizontal direction and that in the vertical direction (steps S14 and S15 of FIG. 8) are performed.

In the above-mentioned present embodiment, the shifts are interpolated in step S12 and the corrections are calculated in step S13. In other words, discrete data pieces obtained by the camera-shake detecting unit 18 are interpolated to generate a shift every line. After that, a correction is calculated every line.

Figure 17:
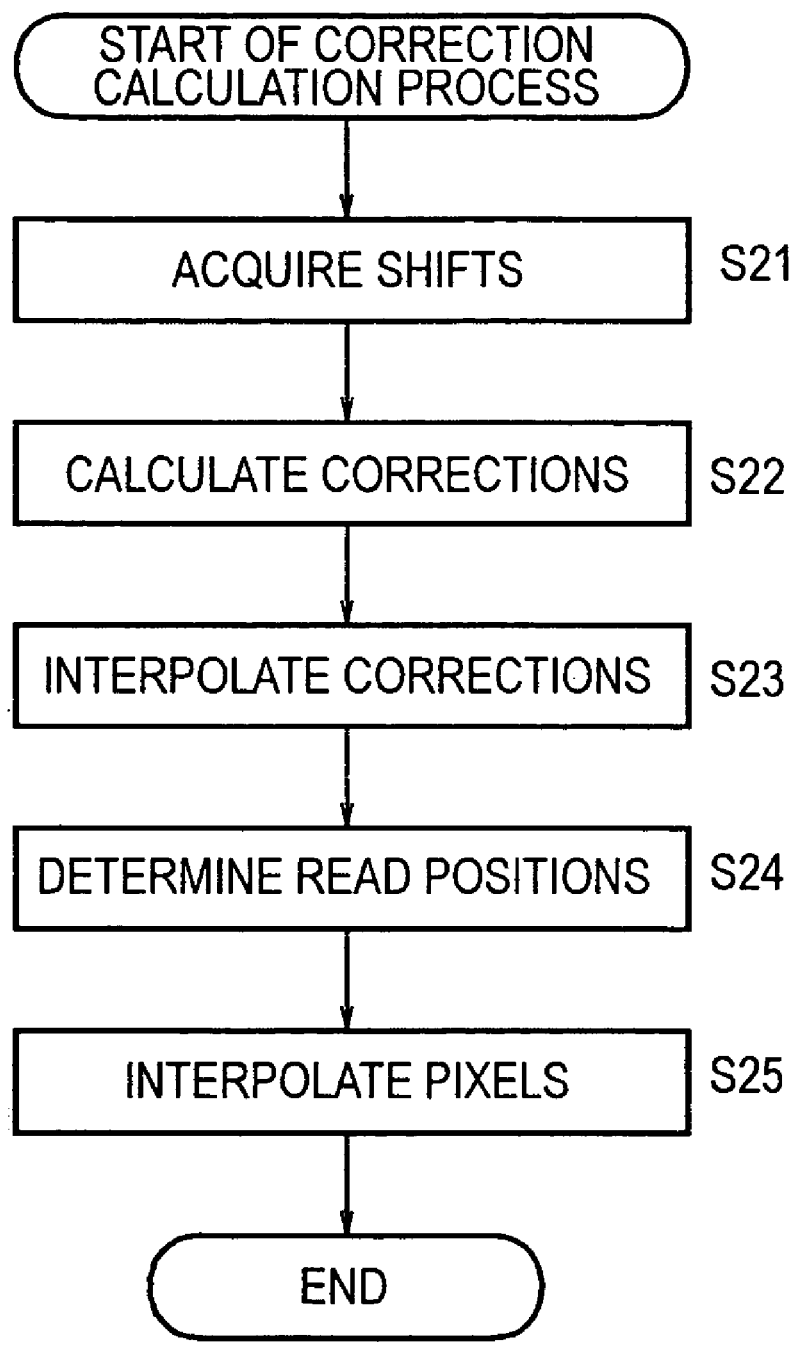
FIG. 17 is a flowchart explaining another operation of the image processing apparatus.

The effects of camera shake can also be corrected according to a flowchart shown in FIG. 17. In step S21, shifts are obtained from the camera-shake detecting unit 18. In step S22, corrections for the shifts are calculated by the correction calculating unit 19. In step S23, the calculated corrections are interpolated to generate a correction every line.

In other words, the discrete corrections are calculated based on discrete data pieces obtained by the camera-shake detecting unit 18. The camera-shake corrections are interpolated to obtain a correction every line. As mentioned above, when the corrections are calculated and the corrections are then interpolated, the same advantages as those of the case where the shifts are interpolated and the corrections are then calculated using the shifts by interpolation can be obtained.

Since step S24 and the following steps are identical to step S14 and the subsequent steps mentioned above, a description thereof will be omitted. For steps S22 and S23, since fundamental processing, e.g., calculating the corrections using a linear function or a non-linear function is identical to that in the flowchart of FIG. 8 described above, a description thereof will be omitted.

Figure 18A:
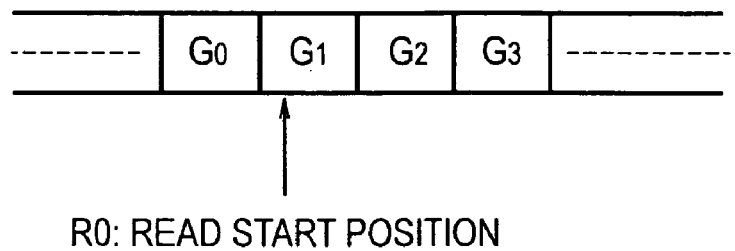
FIG. 18A is a diagram explaining pixel readout.

As mentioned above, the correction calculating unit 19 calculates the corrections. As shown in FIG. 5, each correction is supplied to the image interpolating unit 14, the TG 15, and the memory controller 16. Pixel readout based on the correction through the respective components will now be described. Referring to FIG. 18A, a read start position R0 is set to a predetermined position in a pixel G1 as an example. This example will now be described.

Figure 18B:
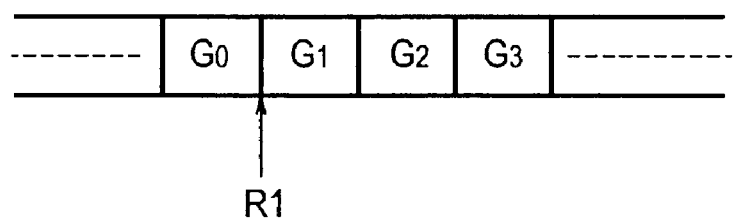
FIG. 18B is a diagram explaining pixel readout.

In this case, the TG 15 controls the readout of pixel data supplied from the imaging device 11 to the AFE 12. The control of the pixel data readout through the TG 15 is performed in units of pixels, whose number is an integer multiple of one pixel. Accordingly, the readout is started from a read start position R1 as shown in FIG. 18B. In this case, the read start position R1 corresponds to the head of the pixel G1.

Figure 18C:
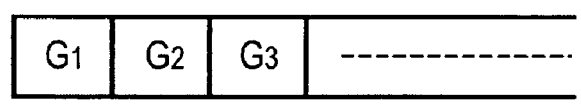
FIG. 18C is a diagram explaining pixel readout.

Therefore, pixel data pieces of the pixel G1 and the following pixels are supplied to the AFE 12 and the subsequent components as shown in FIG. 18C.

In other words, rough shift correction is performed under the control of the TG 15.

Subsequently, the image interpolating unit 14 and the memory controller 16 correct a shift by a fraction of one pixel. First, pixel data shown in FIG. 18C is sequentially stored into the memory 17 through the image interpolating unit 14 under the control of the memory controller 16. The memory controller 16 reads the pixel data stored in the memory 17 as necessary and supplies the read data to the image interpolating unit 14.

The readout under the control of the memory controller 16 and a process of the image interpolating unit 14 will be described. In this case, as shown in the upper part of FIG. 18D, pixel data is read from a read start position R2 located in the middle of the pixel G1. However, data cannot be read from the middle of the pixel. As shown in the lower part of FIG. 18D, therefore, pixel data pieces of pixels G1', G2', . . . are produced (interpolated) instead of readout and are then generated.

The interpolation process, which has already been described above with reference to FIGS. 13A, B and 15A, B, is performed such that each pixel data is multiplied by a coefficient or the like. Pixels are generated (interpolated) in the horizontal and vertical directions. According to the processes, fine shift correction is performed. The memory 17 to store pixel data is required to the fine correction. The memory controller 16 is also required to control the writing and reading to/from the memory 17. Therefore, the present apparatus has the structure shown in FIG. 5.

In the example in FIG. 5, pixel data (image data) output from the signal processing unit 13 is stored in the memory 17 through the image interpolating unit 14 under the control of the memory controller 16. According to the structure, before the above-mentioned pixel interpolation by the image interpolating unit 14 (when data is supplied from the signal processing unit 13 to the memory controller 16), the resolution of an image is converted and the image with the converted resolution can be subjected to camera shake correction.

In other words, the image interpolating unit 14 can convert the resolution of input data or interpolate pixels of output data. As mentioned above, when the image interpolating unit 14 can process both of pixel data (image data) to be stored in the memory 17 and the stored pixel data, process variations can be realized.

In the above-mentioned embodiment, the case where the image processing apparatus 10 includes the TG 15 has been described as an example. The TG 15 is not always necessary for shift correction. The present invention can be applied in a case where the image processing apparatus 10 does not include the TG 15.

Figure 18D:
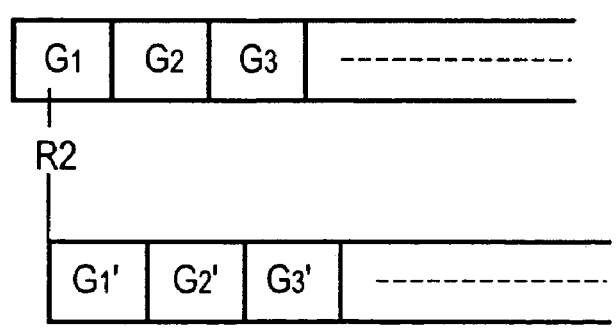
FIG. 18D is a diagram explaining pixel readout.

When the image processing apparatus 10 does not include the TG 15, the above-mentioned pixel interpolation (readout and generation) can be performed by the image interpolating unit 14 and the memory controller 16. When a read start position based on the correction calculated by the correction calculating unit 19 corresponds to the read start position R0 in FIG. 18A, pixel data generation as shown in FIG. 18D can be started from the pixel G1 without using the rough correction by the TG 15. In other words, both of the rough correction and the fine correction can be performed by the image interpolating unit 14 and the memory controller 16.

In the above-mentioned embodiment, the capacity of the memory 17 has not been described. For example, if the memory 17 can store data of one image, the memory 17 has enough capacity. As will be described below, even when the memory 17 has a capacity in which data of one image cannot be stored, so long as a correction is processed, the shift correction process can be performed. In other words, if the capacity of the memory 17 is small, the above-mentioned shift correction process can be performed with high accuracy.

Shift correction in the horizontal direction will now be described. The description will be made on the assumption that the image processing apparatus 10 includes the camera-shake detecting unit 18 (FIG. 5) for detecting camera shake information eight times in one field or one frame as shown in FIG. 19. When exposure time is set as shown in FIG. 19, camera shake information of a line 1 can be calculated on the basis of information pieces a1 to a6. In this case, it is assumed that the above conditions are set.

As mentioned above, according to the present embodiment, corrections to correct shifts caused by given camera shake are interpolated (calculated) using data pieces concerning predetermined lines to provide a correction every line. Again referring to FIG. 9B, when the shifts or the corrections are obtained by interpolation, the shifts regarding the lines 2' to 49' or the corrections thereof cannot be obtained without using camera shake information pieces regarding the two lines 1' and 50'.

Referring to FIG. 19 however, when the information pieces a1to a6 are used as camera shake information pieces of the line 1 (e.g., the line 1'), i.e., when camera shake information pieces (six pieces in this case), which can be obtained in the exposure time of the corresponding line, are used, the next shift cannot be calculated until the next information a7 is acquired. In this case, the information a7 is obtained upon reading a line i (e.g., the line 50').

In the case where the shift is calculated using six camera shake information pieces, therefore, the interpolation process cannot be performed with respect to lines 2 to (i−1) (e.g., the lines 2' to 49') between the lines 1 and i until the data a7 in the line i is obtained. In other words, according to the above-mentioned camera shake detection, when a line in a predetermined position is read, camera shake information of the line is not obtained. Unfortunately, a position to read pixel data cannot be determined by shift correction. Therefore, it is necessary to execute the reading operation (and the interpolation process) after image data is temporarily stored in the memory 17 and corrections are calculated.

According to the present embodiment, however, the shift regarding the line 1 is calculated based on the information pieces a2 to a5. In other words, the information pieces at both ends are eliminated from the camera shake information pieces which can be obtained for the exposure time and the shift is calculated from the four intermediate information pieces.

As mentioned above, in the case where the shift is calculated using intermediate information pieces (the middle information piece and the previous and following information pieces of time sequence information pieces), after the exposure time of the line 1 is over, the information pieces a3 to a6 required to calculate the shift of the line i are already detected (obtained). Accordingly, the shift regarding the line i can be calculated at time when the exposure time of the line 1 is over. Thus, the shift concerning each of the lines 2 to (i−1) can be obtained (calculated) on the basis of the shift regarding the line 1 and that regarding the line i at time when the exposure time of the line 1 is over.

Therefore, if image data is not temporarily stored in the memory 17 in order to calculate the shifts, the shifts and the corrections can be calculated. Thus, even when image data is not stored in the memory 17, shift correction in the horizontal direction can be preformed.

If the shift regarding the line 1 is calculated using the intermediate information pieces a3 and a4, i.e., if the shift of the line 1 is obtained using only two intermediate information pieces, the shifts of the lines i to j can be calculated at time when the shift of the line 1 is obtained (the exposure time of the line 1 is over).

In this case, the shift of the line 1 is generated based on little information. When a shift is corrected every line additionally using the shifts of other lines (e.g., the lines i and j with respect to the line 1), i.e., the shifts of a plurality of lines, the shift of the line 1 can be calculated with higher accuracy. Thus, the corrections can be obtained with higher accuracy.

Subsequently, shift correction in the vertical direction will be described. Since the vertical shift correction is fundamentally similar to the foregoing horizontal shift correction, the difference therebetween will now be described. The vertical shift correction will be explained by again referring to FIG. 19. Similar to the foregoing horizontal shift correction, a shift regarding a first line (line 1) is calculated using, e.g., the information pieces a2 to a5. After exposure time for the first line is over, the information pieces a3 to a6 required to calculate the shift of the line i are already detected (obtained).

Accordingly, the image processing apparatus 10 need not include the memory 17 having a capacity for storing image data of one image as in the case of the foregoing horizontal shift correction. If the memory 17 has a small capacity, shift correction to which the present invention is applied can be performed with high accuracy.

However, the vertical shift correction differs from the horizontal shift correction in that a plurality of lines have to be processed as described above with reference to FIGS. 14 and 15. Therefore, the image processing apparatus 10 has to include the memory 17 having a capacity for storing pixel (image) data corresponding to pixels (of, e.g., ten lines) required to interpolate shifts and pixels.

As mentioned above, although the image processing apparatus 10 needs to include the memory 17, the memory 17 has a capacity for storing one image or a smaller capacity. The capacity of the memory 17 can be reduced. Therefore, the capacity of the memory 17, excluding the capacity necessary to store image data for shift correction, can be used for another process. Alternatively, the capacity of the memory 17 is reduced, thus reducing the cost of the memory 17.

As mentioned above, the camera-shake detecting unit 18 (FIG. 5) calculates the shifts (corrections) based on information pieces obtained for a short time, thus resulting in a reduction in the capacity of the memory 17. In the above-mentioned embodiment, for ease of explanation, eight camera shake information pieces are detected in one field or one frame. In the application of the present invention, the number of camera shake detection times is not limited. The present invention can be applied to shift correction with any camera shake detection times.

In image capturing by the imaging apparatus using an X-Y addressing solid-state imaging device, image information of each pixel is read just after exposure time is over. When the approach, whereby the capacity of the memory 17 can be reduced, is used as mentioned above, the following problem may occur: If the exposure time decreases (shutter speed increases, i.e., the relation of camera shake detection interval>half exposure time is satisfied), in some cases, the shift at the next time is not detected at timing when pixel information is read.

The problem will now be described with reference to FIG. 20. In a first area, the center of exposure of each line is located between the information pieces a4 and a5 regarding camera shake detection. At that time, the shift has to be interpolated based on the information pieces a4 and a5. When each line in the first area is read, however, the information piece a5 regarding camera shake is not detected. Accordingly, shifts cannot be obtained by interpolation in the first area.

In a second area, read time for each line is after detection time of the information piece a5. Since the center of exposure for each line is located between the information pieces a4 and a5 regarding camera shake detection and the information pieces a4 and a5 regarding camera shake are already detected, a shift can be obtained every line by interpolation based on the camera shake information pieces as the information pieces a4 and a5.

In a third area, the center of exposure for each line is located after the detection time of the information piece a5, i.e., between the camera shake information piece a5 and the information piece a6. The shift of each line has to be obtained by interpolation on the basis of the information pieces a5 and a6. When each line in the third area is read, however, the information piece a6 regarding camera shake is not detected. Accordingly, shifts cannot be obtained by interpolation in the third area.

As mentioned above, when the condition of (camera shake detection interval)>(half exposure time) is satisfied, some areas where a shift cannot be obtained every line by interpolation may occur.

When the sampling frequency for camera shake detection is increased, the camera shake detection interval is reduced, so that the foregoing problem can be prevented. However, computational complexity and communication complexity increase, resulting in an increase in system load.

Figure 21:
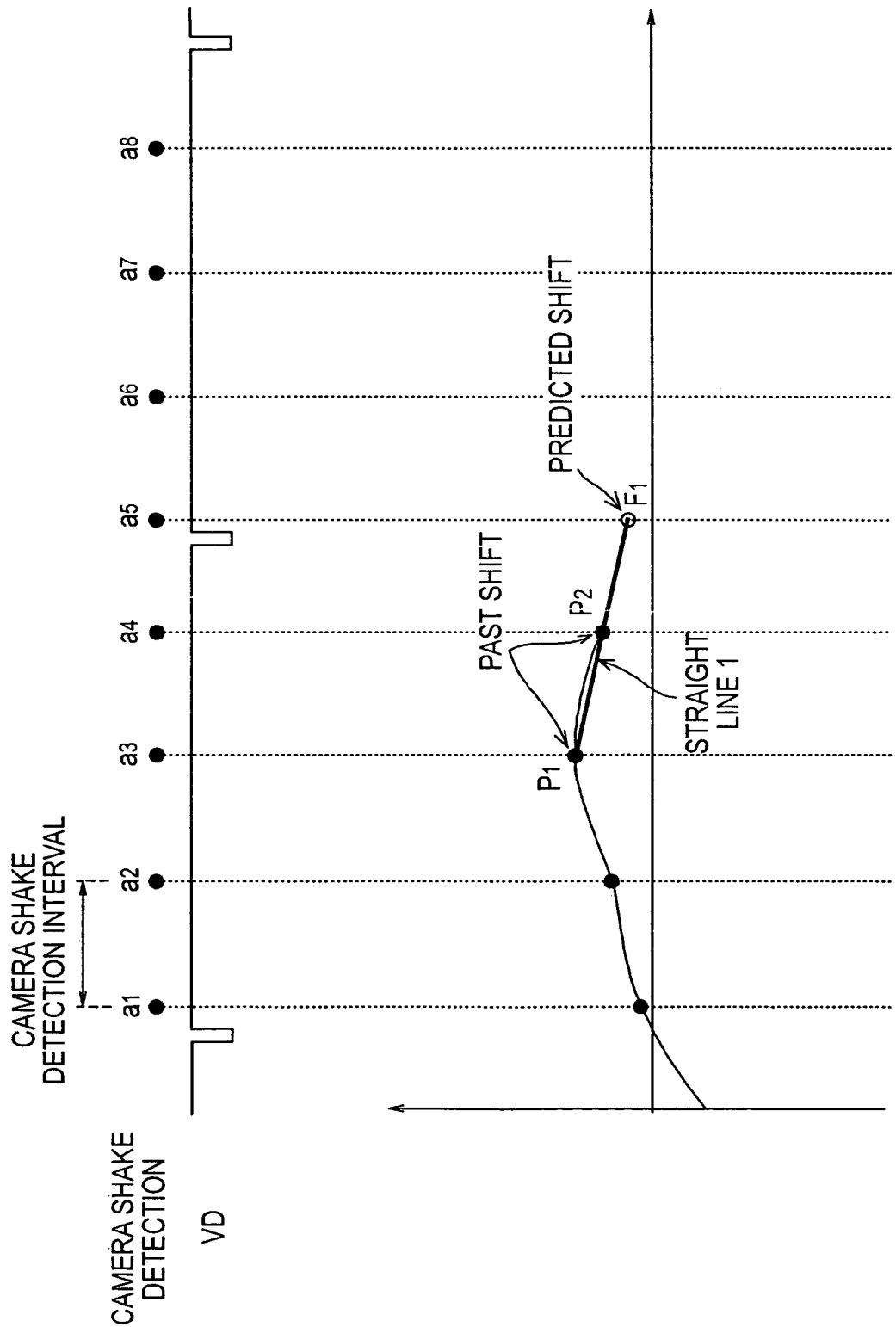
FIG. 21 is a diagram explaining the prediction of a shift.

As an approach for reducing the system load and solving the above-mentioned problem, predicting a shift is used. Referring to FIG. 21, for example, in order to calculate a shift F1, past shifts P1 and P2 are used, a straight line 1 is obtained based on the shifts P1 and P2, and the shift F1 is calculated as one point on the extension of the straight line 1.

The approach is one example. The number of past camera shake data pieces used for prediction and a predictive algorithm are not limited.

According to the above-mentioned embodiment, in executing the process of obtaining a shift (correction) in the vicinity of the upper or lower end of a frame by interpolation, calculation for interpolation can be performed using shift data pieces of the previous and subsequent fields or frames. Consequently, a correction to correct a shift can be calculated with higher accuracy. Thus, shifts can be corrected with higher accuracy.

In the above embodiment, an image to be captured has not been described in detail. Either of a still image and a moving image can be used as an image to be captured. In other words, the present invention can be applied to a camera for capturing still images and a camera for capturing moving images.

As mentioned above, according to the present invention, data to correct a shift can be obtained every line constituting an image can be obtained by interpolating a little amount of detected data regarding camera shake. In addition, pixel data is interpolated in order to correct a shift of one pixel or smaller. Thus, the distortion of an image can be corrected every line with an accuracy of one pixel or smaller, the distortion being caused by camera shake given to an image processing apparatus such as a video camera using an X-Y addressing solid-state imaging device, e.g., a CMOS image sensor.

According to the present invention, further, the capacity of the memory 17 for storing image data of a captured image can be reduced. Naturally, the present invention can be applied to a video camera using a charge-transfer solid-state imaging device such as a CCD image sensor in addition to the X-Y addressing solid-state imaging device such as a CMOS image sensor.

The above-mentioned process of correcting for camera shake can be executed by hardware having respective functions. The process can also be executed by software. When a series of processing steps is executed by software, a computer in which a program including the software is installed in special hardware is used. Alternatively, the program is installed from a recording medium on, e.g., a general-purpose computer on which various programs are installed to execute various functions.

To explain a recording medium, a personal computer using a recording medium will now be described in brief. FIG. 22 shows the internal structure of a general-purpose personal computer. A CPU (Central Processing Unit) 201 of the personal computer executes various processes according to a program stored in a ROM (Read Only Memory) 202. Data and programs required to execute the various processes through the CPU 201 are appropriately stored in a RAM (Random Access Memory) 203. An input unit 206 including a keyboard and/or a mouse is connected to an input-output interface 205, which outputs a signal, supplied to the input unit 206, to the CPU 201. An output unit 207 including a display and/or a speaker is connected to the input-output interface 205.

Further, a storage unit 208 including a hard disk and a communication unit 209 for transmitting and receiving data to/from another device through a network such as the Internet are connected to the input-output interface 205. A drive 210 is used to write and read data to/from recording media such as a magnetic disk 221 an optical disk 222 a magneto-optical disk 223 and a semiconductor memory 224.

As shown in FIG. 22, the recording medium includes a package medium, in which a program is recorded and which is distributed separately from the personal computer to provide the program to a user, such as the magnetic disk 231 (including a flexible disk), the optical disk 232 (including a CD-ROM (Compact Disc-Read Only Memory) or a DVD (Digital Versatile Disc)), the magneto-optical disk 233 (including an MD (Mini-Disc) (registered trademark)), or the semiconductor memory 234. Alternatively, the recording medium includes a hard disk, in which a program is stored, built in a computer provided to a user, the hard disk including the ROM 202 or the storage unit 208.

In this specification, steps describing the program provided through a medium include not only processes to be executed in the described order on a time series basis but also processes which are not always executed on a time series basis and are carried out simultaneously or individually.

INDUSTRIAL APPLICABILITY

According to the present invention, shifts caused by camera shake given in image capturing can be corrected.

According to the present invention, shifts can be corrected with higher accuracy.

According to the present invention, a shift of one pixel or smaller can be corrected.

According to the present invention, the capacity of a memory for storing image data required to correct shifts caused by camera shake can be reduced.

According to the present invention, even when exposure time is reduced, the capacity of a memory for storing image data required to correct shifts can be reduced.

The invention claimed is:

1. An image processing apparatus for capturing and processing an image, comprising:
 an X-Y addressing solid-state imaging device having differences in exposure time between lines;
 a first shift generating unit to generate a first shift indicating a magnitude of a given vibration,
 wherein a number of the first shift generated in every field or every frame is less than that of lines of the X-Y addressing solid-state imaging device;
 a second shift generating unit to generate a second shift for every line of the X-Y addressing solid-state imaging device, wherein the second shift is generated from at least two of the first shifts;

a calculating unit to calculate a correction from the second shift for every line of the X-Y addressing solid-state imaging device; and a correction unit to correct the given vibration on the image captured by the X-Y addressing solid-state imaging device on a line by line basis according to the correction and to output a corrected image.

2. The image processing apparatus according to claim 1, wherein the first shift generating unit further includes:

output means for detecting the given vibration to generate vibration detection information; and converting means for converting the vibration detection information generated from the output means into the first shift indicating the magnitude of the given vibration.

3. The image processing apparatus according to claim 1, wherein the second shift is generated from at least three of the first shifts.

4. An image processing apparatus for capturing and processing an image, comprising:

an X-Y addressing solid-state imaging device having differences in exposure time between lines;

a shift generating unit to generate a shift indicating a magnitude of a given vibration, wherein a number of the shift generated in every field or every frame is less than that of lines of the X-Y addressing solid-state imaging device;

a first correction calculating unit to calculate a first correction from the shift, wherein a number of the first corrections is same as that of the shifts;

a second correction calculating unit to calculate a second correction for every line of the X-Y addressing solid-state imaging device, wherein the second correction is calculated from at least two of the first corrections; and a correcting unit to correct the given vibration on the image captured by the X-Y addressing solid-state imaging device on a line by line basis according to the second correction and to output a corrected image.

5. The image processing apparatus according to claim 4, wherein the shift generating unit further includes:

output means for detecting the given vibration to generate vibration detection information; and converting means for converting the vibration detection information generated from the output means into the shift indicating the magnitude of the given vibration.

6. The image processing apparatus according to claim 4, wherein the second correction is calculated from at least three of the first corrections.

7. An image processing method of an image processing apparatus for capturing and processing an image, wherein the image processing apparatus comprises an X-Y addressing solid-state imaging device having differences in exposure time between lines, the image processing method comprising the steps of:

generating a first shift indicating a magnitude of a given vibration, wherein a number of the first shift generated in every field or every frame is less than that of lines of the X-Y addressing solid-state imaging device;

generating a second shift for every line of the X-Y addressing solid-state imaging device, wherein the second shift is generated from at least two of the first shifts;

calculating a correction from the second shift for every line of the X-Y addressing solid-state device;

correcting the given vibration on the image captured by the X-Y addressing solid-state imaging device on a line by line basis according to the correction; and outputting a corrected image.

8. The image processing method according to claim 7, wherein the first shift generating step further includes the steps of:

detecting the given vibration to generate vibration detection information; and converting the vibration detection information into the first shift that indicates the magnitude of the given vibration.

9. The image processing method according to claim 7, wherein the second shift is generated from at least three of the first shifts.

10. An image processing method of an image processing apparatus for capturing and processing an image, wherein the image processing apparatus comprises an X-Y addressing solid-state imaging device having differences in exposure time between lines, the image processing method comprising the steps of:

generating a shift indicating a magnitude of a given vibration, wherein a number of the shift generated in every field or every frame is less than that of lines of the X-Y addressing solid-state imaging device;

calculating a first correction from the shift, wherein a number of the first corrections is same as that of the shifts;

calculating a second correction for every line of the X-Y addressing solid-state imaging device, wherein the second correction is calculated from at least two of the first corrections; and correcting the given vibration on the image captured by the X-Y addressing solid-state imaging device on a line by line basis according to the second correction and to output a corrected image.

11. The image processing method according to claim 10, wherein the shift generating step further includes the steps of:

detecting the given vibration to generate vibration detection information; and converting the vibration detection information into the shift that indicates the magnitude of the given vibration.

12. The image processing method according to claim 10, wherein the second correction is calculated from at least three of the first corrections.

* * * * *